United States Patent [19]
Moore

[11] Patent Number: 5,982,472
[45] Date of Patent: Nov. 9, 1999

[54] SELF-ALIGNED PIXEL WITH SUPPORT PILLARS FOR A LIQUID CRYSTAL LIGHT VALVE

[75] Inventor: Paul McKay Moore, San Bruno, Calif.

[73] Assignee: National Semiconductor Corporation, Santa Clara, Calif.

[21] Appl. No.: 09/211,060

[22] Filed: Dec. 14, 1998

[51] Int. Cl.[6] ............ G02F 1/1339; G02F 1/1343; G02F 1/13; H01L 23/48
[52] U.S. Cl. ............ 349/156; 349/187; 349/147; 257/752
[58] Field of Search .................. 349/147, 155, 349/156, 138, 187; 257/752

[56] References Cited

U.S. PATENT DOCUMENTS

| | | | |
|---|---|---|---|
| 4,103,297 | 7/1978 | McGreivy et al. | 340/324 |
| 4,239,346 | 12/1980 | Lloyd | 350/334 |
| 4,602,850 | 7/1986 | DeBenedetti | 350/333 |
| 5,159,476 | 10/1992 | Hayashi | 359/54 |
| 5,244,534 | 9/1993 | Yu et al. | 156/636 |
| 5,365,355 | 11/1994 | Hastings, III et al. | 359/59 |
| 5,461,501 | 10/1995 | Sato et al. | 359/59 |
| 5,497,025 | 3/1996 | Wong | 257/435 |
| 5,706,067 | 1/1998 | Colgan et al. | 349/114 |
| 5,710,460 | 1/1998 | Leidy et al. | 257/752 |
| 5,764,324 | 6/1998 | Lu et al. | 349/113 |

OTHER PUBLICATIONS

Moore et al., Silicon Interconnect Passivation and Metallization Process Optimized To Maximize Reflectance, Co–pending U.S. appln. No. 09/136,627, filed Aug. 19, 1998.

Paul Moore, Polished Self–Aligned Pixel for a Liquid Crystal Silicon Light Valve, Co–pending U.S. appln. No. 09/204,825, filed Dec. 3, 1998.

Moore, et al., Thin Liquid Crystal Transducer Pixel Cell Having Self–Aligned Support Pillars, Co–pending U.S. appln. No. 09/058,623, filed Apr. 9, 1998.

Moore, et al., Reflectance Enchancing Thin Film Stack, Co–pending U.S. appln. No. 08/872,013, filed Jun. 9, 1997.

*Primary Examiner*—William L. Sikes
*Assistant Examiner*—Tarifu R. Chowdhury
*Attorney, Agent, or Firm*—Limbach & Limbach L.L.P.

[57] ABSTRACT

An array of pixel cells for a liquid crystal light value includes support pillars separating the array surface from a translucent top plate. During fabrication, a series of raised intersecting spacer walls having sides and a top surface are first formed by etching a thick oxide layer to stop on a nitride layer. Exposed nitride etch-stop layer is then removed, and electrode liner, metal electrode, and passivation layers are formed over the entire structure, including the sides and top surface of the spacer walls. Photoresist is then spun, hardened, and etched to expose the passivation formed over the tops of the spacer walls. The exposed passivation layer, and pixel liner and metal electrode material underneath the exposed passivation layer at the margins of the spacer walls are then etched. A photoresist mask is patterned to cover points of intersection of the spacer walls, and unmasked lengths of spacer walls are etched to stop on the nitride etch-stop layer. Stripping the photoresist mask reveals raised support pillars at the corners of the pixels, with pixel electrodes electrically isolated from each other by inter-pixel isolation strips formed by the nitride bases of the former spacer walls. Careful control of the prior etching along the spacer wall margins creates an array surface having electrodes substantially planar with the inter-pixel isolation strips.

20 Claims, 17 Drawing Sheets

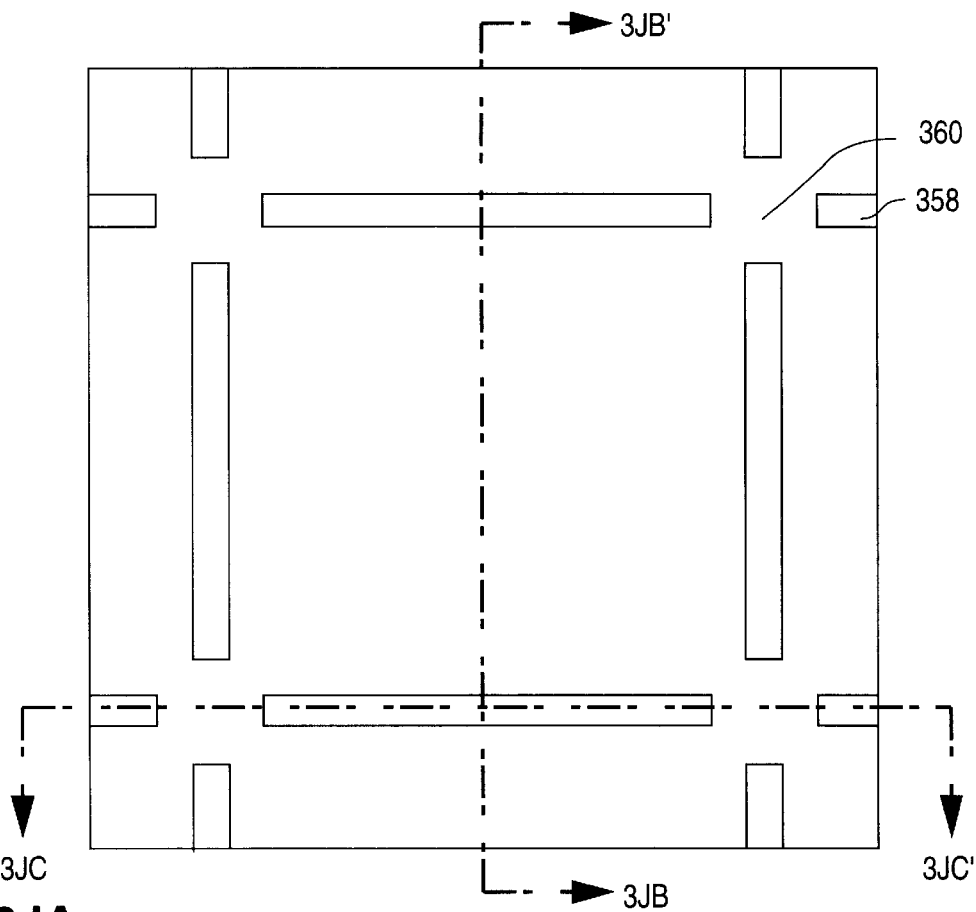
FIG. 3JA
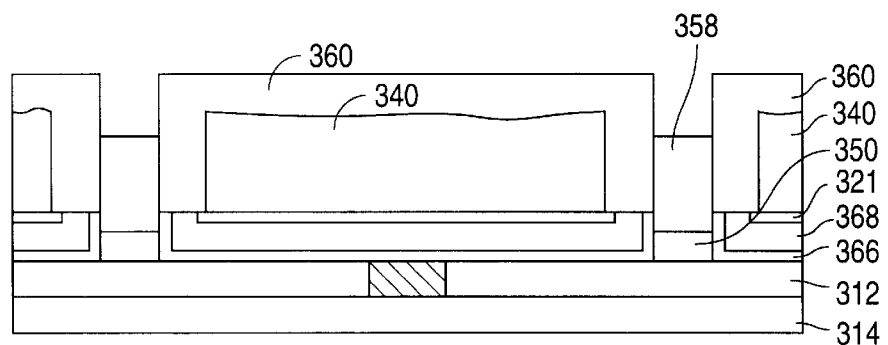
FIG. 3JB
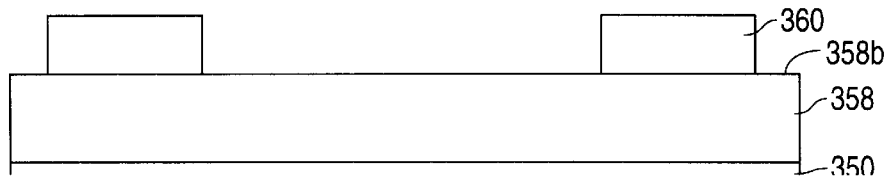

SELF-ALIGNED PIXEL WITH SUPPORT PILLARS FOR A LIQUID CRYSTAL LIGHT VALVE

BACKGROUND OF THE INVENTION

1. Field of the Invention

The present invention relates to light valves, and in particular, to light valves utilizing thin liquid crystal transducer pixel cells having self-aligned pillars for supporting the top glass substrate.

2. Description of the Related Art

Liquid crystal displays (LCDs) are becoming increasingly prevalent in high-density projection display devices. These display devices typically include a light source which passes light through a light valve.

One of the methods for producing colors in a liquid crystal display is to sequentially project light having a wavelength corresponding to a primary color onto a single light valve. Color sequential light valves create a spectrum of color within the range of the human perception by switching between a set of discrete primary colors. Typically, red, green, and blue are the primary tri-stimulus colors used to create the remaining colors of the spectrum.

Specifically, during projection of each primary color, the light intensity is modulated such that combination of the intensities of the primary colors in sequence produces the desired color. The frequency of switching between the primary wavelengths by the light valve should be sufficiently rapid to render discrete primary states indistinguishable to the human eye. Two factors dictate the minimum frequency necessary for switching.

The first factor is the ability of the human eye to detect the discrete primary colors (e.g., red, green, blue). At slower than ideal switching speeds, the human eye will detect a flicker and the primaries may not blend.

The second factor determining the frequency of switching is the video refresh rate. During display of video images, the individual frames must be refreshed at frequencies undetectable to the human eye.

The net frequency of switching demanded by the combination of sequential color blending and video refreshing is beyond the capabilities of light valves that utilize thick (>1 $\mu$m) liquid crystal (LC) transducers. However, thin (<1 $\mu$m) liquid crystal transducers have been successfully fabricated. These thin LC transducers demonstrate adequate color sequential blending at video refresh rates. One example of such a thin LC transducer pixel cell structure is disclosed in U.S. Pat. No. 5,706,067, to Colgan et al.

In general, the conventional thin LC transducer pixel cells possess enhanced responsiveness due to the decreased volume of liquid crystal material between the top and bottom plates. A smaller volume enables the liquid crystal to shift orientation more quickly and in response to a lower applied voltage.

FIG. 1A shows a top view of a conventional thin LC transducer pixel cell. FIG. 1B shows a cross-sectional view of the thin liquid crystal transducer along line A–A' of FIG. 1A. FIG. 1C shows a cross-sectional view of the thin liquid crystal transducer along line B–B' of FIG. 1A.

Thin LC transducer pixel cell 100 comprises a layer of liquid crystal (LC) material 102 sandwiched between a top plate 104 and a bottom plate 106. Top plate 104 is physically supported and separated from bottom plate 106 by support pillars 105. Top plate 104 is a translucent material, typically glass. Bottom plate 106 is a reflective pixel electrode layer.

Pixel electrode layer 106 actually consists of two layers: a metal electrode layer 108 on top of an electrode liner layer 110. Pixel electrode layer 106 is delineated into individual pixel electrodes 130 by intervening trenches 118.

Pixel electrode layer 106 lies on top of an upper intermetal dielectric layer 112 that is one component of an interconnect scheme. This interconnect overlies a capacitor structure formed within an underlying silicon substrate (not shown). Upper intermetal dielectric layer 112 electrically insulates pixel electrode 130 from lower metallization layer 114. The underlying capacitor structure is in electrical communication with pixel electrode 130 through metal-filled via 116.

FIGS. 2AA–2EC illustrate the conventional process for forming a thin LC transducer pixel cell. For purposes of convention, all FIGS. 2_A illustrate a top view of the pixel cell, all FIGS. 2_B illustrate a cross-sectional view of the pixel cell along line A–A' of the FIG. 2_A, and all FIGS. 2_C illustrate a cross-sectional view of the pixel cell along line B–B' of the FIG. 2_A.

FIGS. 2AA–2AC illustrate the starting point for the conventional process for fabricating a thin LC transducer pixel cell. Starting structure 200 is created by forming an upper intermetal dielectric layer 212 over a lower interconnect metallization layer 214. A central portion of upper intermetal dielectric layer 212 is then etched to form via 216. A liner (not shown) typically composed of a Ti/TiN layer combination, is then formed on the walls of via 216, and via 216 is filled with metal (typically CVD Tungsten). Excess metal is then removed from the surface of upper dielectric layer 212, typically by a combination of etching-and chemical-mechanical polishing (CMP).

FIGS. 2BA–2BC illustrate formation of the pixel electrode in accordance with the conventional process. Pixel electrode layer 206 is formed over the entire surface of the pixel cell. Pixel electrode layer 206 actually consists of three separate layers. Pixel electrode layer 206 is formed by the deposition of an electrode liner layer 210, typically a Ti film, to promote adhesion of the metal electrode to the underlying intermetal dielectric. Next, metal electrode layer 208, typically an Al/Cu mixture, is formed over electrode liner layer 210. A passivation layer 220 is then formed on top of metal layer 208.

FIGS. 2CA–2CC illustrate delineation of pixel electrode layer 206 into discrete electrodes of individual pixel cells in accordance with the conventional process. During this step, a photoresist mask is patterned over pixel electrode layer 206, and then unmasked regions of the pixel electrode layer 206 are etched to form a plurality of intersecting trenches 218. Intersecting trenches 218 in turn define a plurality of pixel cell electrodes 230.

FIGS. 2DA–2DC illustrate the first step of forming support pillars in accordance with the conventional process. In this first step, a thick dielectric layer 232 (typically $SiO_2$ or $Si_3N_4$) is deposited at high temperatures (300 to 400° C.) over the entire surface of the pixel cell, including trenches 218. Because trenches 218 are relatively narrow, dielectric material is typically deposited at a faster rate at the corners of trenches 218. Uneven deposition of dielectric material within trenches 218 may be further exacerbated when the trench exhibits a re-entrant side wall profile. The uneven deposition rate of dielectric material ultimately gives rise to formation of keyhole voids 234 within the trenches.

FIGS. 2EA–2EC illustrate the second step of forming support pillars in accordance with the conventional process. In this second step of pillar formation, a pattern of-photoresist is deposited on top of thick dielectric layer 232. Unmasked portions of thick dielectric layer 232, typically located at the corners of the pixel cells 230, are then etched to leave support pillars 205. Because of the necessity of etching through all of thick dielectric layer 232, passivation film 220 and some portion of metal layer 208 are also typically exposed to etchant during this step.

Fabrication of the thin LC transducer pixel cell is completed by forming an alignment surface (not shown) for the LC material positioned on top of the pixel electrode. Forming this alignment surface is a two step process. First, a dielectric film (typically polyamide) is deposited on top of the pixel electrodes. Second, the dielectric film is scored by a rubbing wheel, which traverses the surface of the-pixel cell and gouges the alignment surface in a uniform-direction. Liquid crystal material is then placed within the cell, and a top glass plate is secured to the tops of the support pillars.

The conventional fabrication process described above is adequate to produce functional thin LC transducer pixel cells. However, the conventional process flow suffers from a number of serious disadvantages.

One problem is that the step of depositing thick dielectric layer 232 on top of pixel electrode layer 206 as shown in FIGS. 2DA–2DC produces hillocks in the metal electrode layer 208. These hillocks are due to the forces exerted by the formation of the thick dielectric layer from which the support pillars are formed. Specifically, there is a tensile stress present in metal electrode layer 208. Exposure of metal layer 208 to the heat of deposition of the dielectric (typically about 300–400° C.) induces a relaxation of the metal surface and creates hillocks. These hillocks render the surface of the pixel electrode uneven, degrading the reflectance of the pixel cell.

Therefore, there is a need in the art for a process of forming a thin LC transducer pixel cell having support pillars that does not require the deposition of a thick dielectric layer directly on top of the pixel electrode.

A second problem associated with the conventional method is that the step of etching the thick dielectric layer 232 from the surface of the pixel electrode layer 206 as shown in FIGS. 2EA–2EC also degrades reflectance of the pixel electrode. When metal electrode layer 208 is freshly deposited as shown in FIGS. 2BA–2BC, metal layer 208 is extremely smooth and exhibits high reflectance. However, etching of the dielectric layer to form the support pillars as shown in FIGS. 2DA–2DC can roughen and/or oxidize the surface of the metal layer, lowering its reflectance.

Therefore, there is a need in the art for a process of forming a thin LC transducer pixel cell having support pillars that does not etch or roughen the surface of the pixel electrode.

A third problem associated with the conventional method is the formation of keyhole voids 234 as shown in FIGS. 2DB–2DC. Because of the narrow width of trenches 218, thick dielectric layer 232 is typically deposited at a faster rate along the corners of trenches 218. This differential rate of deposition ultimately promotes formation of keyhole voids 234 within support pillars 205. Keyhole voids 234 can weaken the structural integrity of the support pillars 205. Weakening of the support pillars 205 by keyhole voids 234 can be especially problematic during subsequent formation of the LC alignment surface, as the rubbing wheel utilized to score the alignment surface can contact the support pillars, subjecting them to high stress.

Therefore, there is a need in the art for a process for fabricating a thin LC transducer pixel cell that eliminates the formation of keyholes inside of the support pillars as described above.

A fourth problem associated with the conventional method is the creation of significant topography on the pixel surface that can result in optical degradation.

Liquid crystal material overlying the pixel electrode has the propensity to align and/or tilt to conform to the shape of any topology present on the surface of the pixel cell. LC alignment is a critical system attribute. The alignment of the twisted nematic LC dictates which polarization of incident light will pass through the LC's volume. In the context of a complete system, this alignment of the LC material defines either the black or white extreme of the-light valve's gray scale. As a result, non-uniformity in alignment due to the presence of surface topology will translate into a poorly constructed display.

In FIGS. 2CA–2CC, the pixel electrode layer is etched to create a plurality of discrete pixel electrodes electronically isolated from one another by a series of intersecting trenches having side walls and a trench bottom. These trench features can cause the overlying LC material to align with the trench. This misalignment can cause unwanted distortion of the image formed using the light valve.

In addition, the surface topology associated with the isolation trenches of FIGS. 2CA–2CC can also interact directly with incident light, causing reflection that is not harmonious with that of the main body of the pixel electrode. The interaction of light with the pixel topography is due to the isolation edges of the pixel. For example, in the pixel array shown in FIGS. 1A–1C, light will scatter from the sidewalls and bottom of the trenches present at the pixel edges. This unwanted scattering reduces the specular reflection of the pixel, and increases optical cross-talk between pixels.

Therefore, there is a need in the art for a process of forming a thin LC transducer pixel cell that creates a minimum of surface topology on the pixel cell surface while maintaining electrical isolation between pixel electrodes.

SUMMARY OF THE INVENTION

The present invention relates to a thin liquid crystal transducer pixel cell including a top and bottom plate separated by support pillars, and a process for fabricating such a liquid crystal transducer.

The liquid crystal light value in accordance with the present invention includes support pillars separating the underlying array of pixel electrodes from the translucent top plate. During fabrication, a series of raised, intersecting dielectric spacer walls are first formed by etching a thick oxide layer to stop on an etch-stop nitride layer. Electrode liner, metal electrode, and passivation layers are then formed over the entire structure, including the sides and tops of the spacer walls. Photoresist is spun, hardened, and etched to expose portions of the passivation layer formed on the tops of the spacer walls. The exposed portion of the passivation layer, and the underlying electrode liner and metal electrode layers on the sides of the spacer walls, are then etched.

Next, a photoresist mask is patterned to include only certain portions of the spacer walls. Unmasked portions of the spacer walls are then etched. This etching yields support pillars and pixel electrodes electrically isolated from each other by the remaining nitride bases of the former spacer walls. Careful control during the prior etching along the spacer wall margins ensures a pixel cell array having electrodes substantially planar with adjacent inter-pixel isolation strips.

Formation of a pixel array in accordance with the present invention obviates the need to deposit a thick dielectric layer at high temperatures on top of the pixel electrode, thereby suppressing hillock formation. The process sequence also prevents exposure of the surface of the pixel electrode to etching. The process in accordance with the present invention further eliminates unwanted formation of keyhole voids that could structurally weaken the support pillars. Finally, the present invention produces a pixel array surface having a minimum of surface topology that could cause misalignment of overlying LC material.

A process for forming an array of thin liquid crystal transducer pixel cells in accordance with one embodiment of the present invention includes the steps of forming a plurality of raised, intersecting dielectric spacer walls over an intermetal dielectric layer, the spacer walls having sides and a top surface, forming an electrode liner layer over the intermetal dielectric layer and the top surface of the spacer walls, forming a metal electrode layer over the electrode liner layer, forming a passivation layer over the metal electrode layer, forming a photoresist layer over the passivation layer, etching the photoresist layer to expose a portion of the passivation layer located over the top surface of the spacer walls, etching the exposed portion of the passivation layer and underlying portions of the electrode liner and metal electrode layers located along the sides of the spacer walls, patterning a support pillar photoresist mask to cover a first portion of the spacer walls and exclude a second portion of the spacer walls, etching the second portion of the spacer walls to produce support pillars.

The features and advantages of the present invention will be understood upon consideration of the following detailed description of the invention and the accompanying drawings.

DETAILED DESCRIPTION

The following co-pending, commonly assigned patent applications contain subject matter related to the present application, and are incorporated herein by reference: U.S. patent application Ser. No. 08/872,013, "REFLECTANCE ENHANCING THIN FILM STACK"; U.S. patent application Ser. No. 09/058,623 (atty. docket no. NSC1-C1600); U.S. patent application Ser. No. 09/058,623, entitled "THIN LIQUID CRYSTAL TRANSDUCER PIXEL CELL HAVING SELF-ALIGNED SUPPORT PILLARS" (atty. docket no. NSC1-D9800): U.S. patent application Ser. No. 09/136,627, entitled "SILICON INTERCONNECT PASSIVATION AND METALLIZATION PROCESS OPTIMIZED TO MAXIMIZE REFLECTANCE" (atty. docket no. NSC1-D9400); U.S. patent application Ser. No. 09/204,825, entitled "POLISHED SELF-ALIGNED PIXEL FOR A LIQUID CRYSTAL SILICON LIGHT VALVE" (atty. docket no. NSC1-F0400).

Figure 3A:
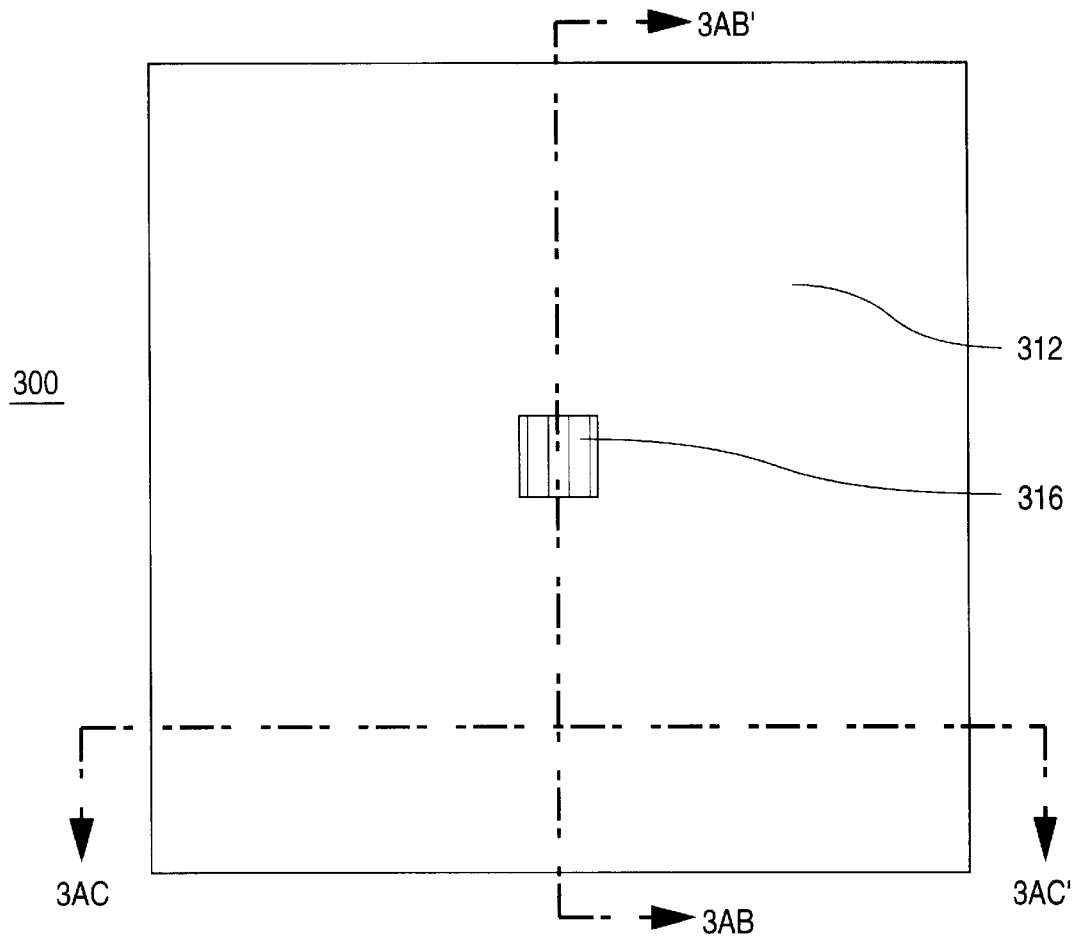
FIGS. 3AA–3KC show top and cross-sectional views of the process steps for forming a thin LC transducer pixel cell in accordance with a first embodiment of the present invention.
Figure 3A:
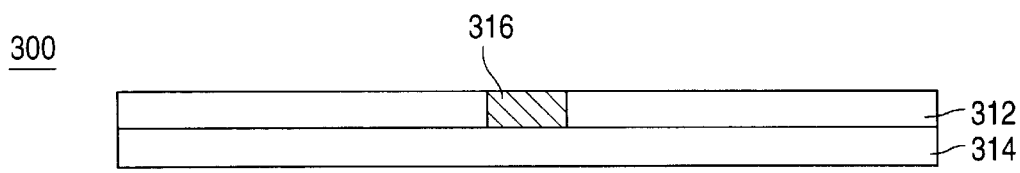
Figure 3A:
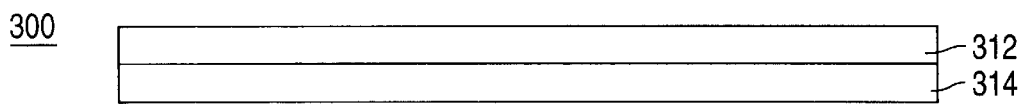

FIGS. 3AA–3KC illustrate the process for forming a thin LC transducer pixel cell in accordance with a first embodiment of the present invention. For purposes of convention, all FIGS. 3_A illustrate a top view of the pixel cell, all FIGS. 3_B illustrate a cross-sectional view of the pixel cell along line A–A' of the FIG. 3_A, and all FIGS. 3_C illustrate a cross-sectional view of the pixel cell along line B–B' of the FIG. 3_A.

Figure 1A:
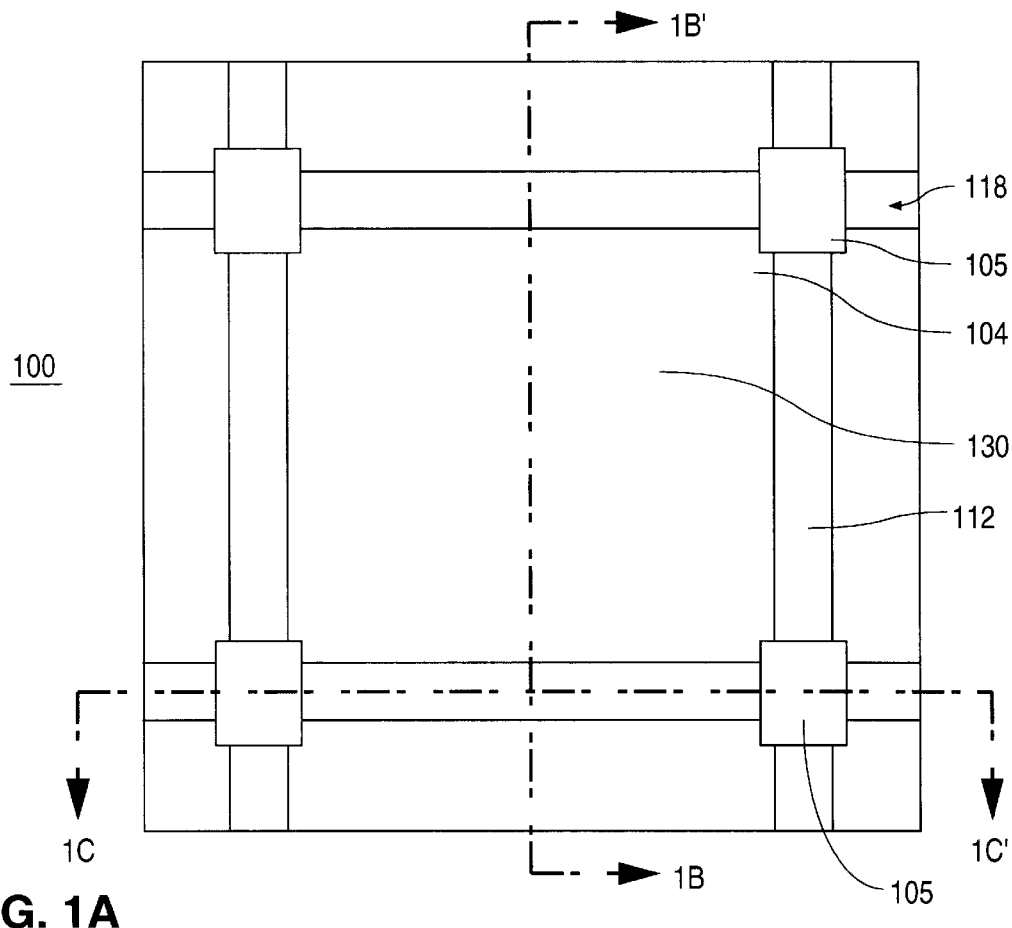
FIGS. 1A–1C shows top and cross-sectional views of a conventional thin LC transducer pixel cell.
Figure 1B:
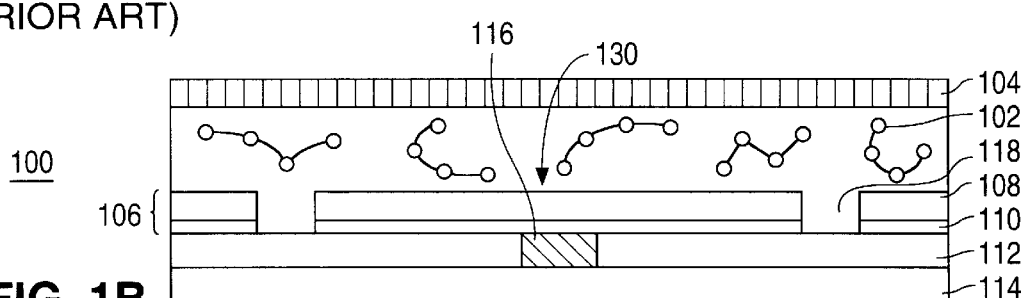
Figure 1C:
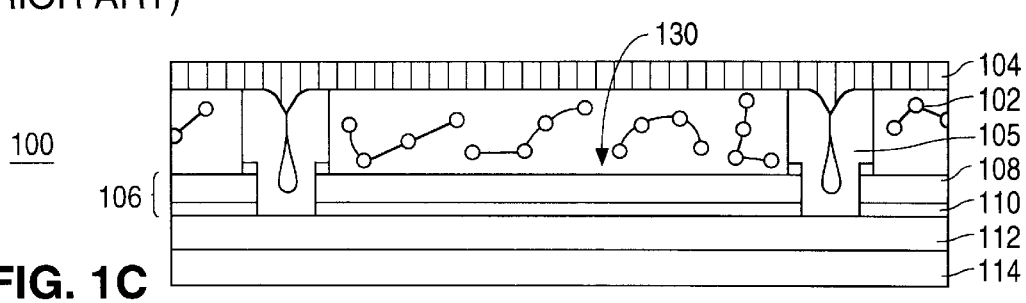
Figure 2A:
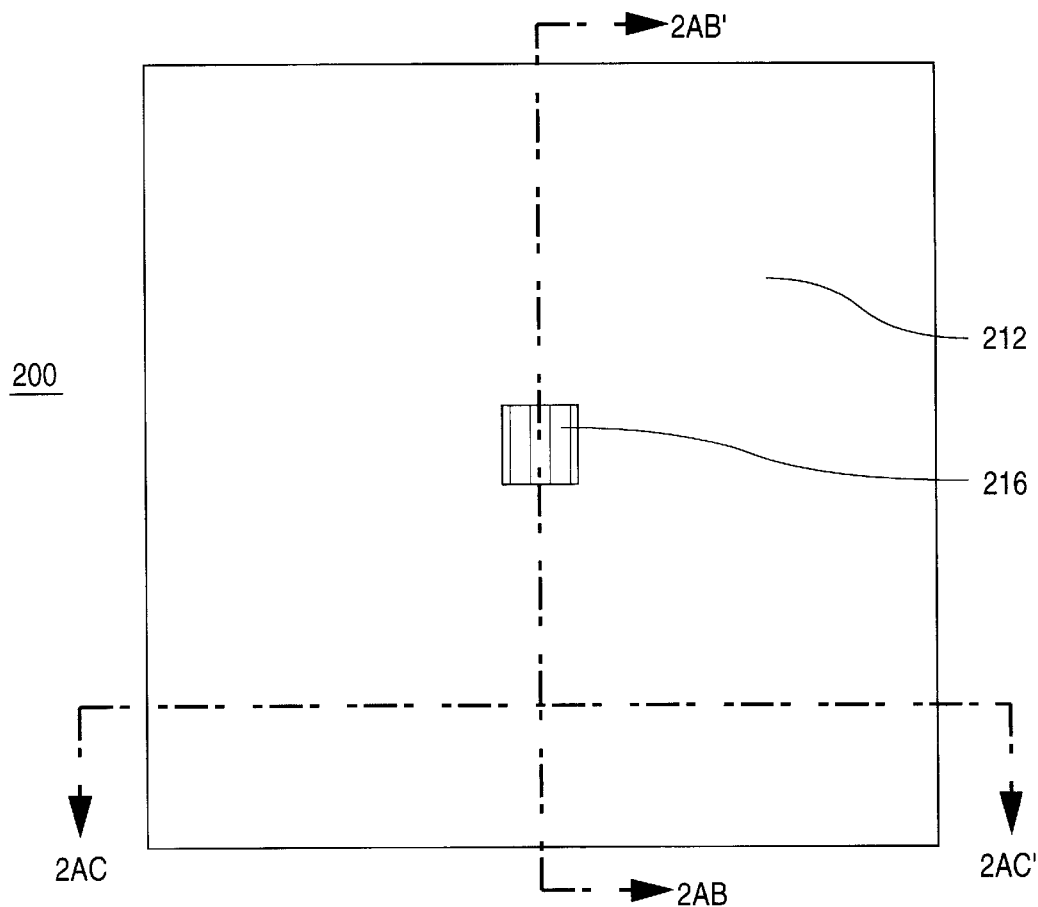
FIGS. 2AA–2EC show top and cross-sectional views of the conventional process steps for forming the thin LC transducer pixel cell shown in FIGS. 1A–1C.
Figure 2A:
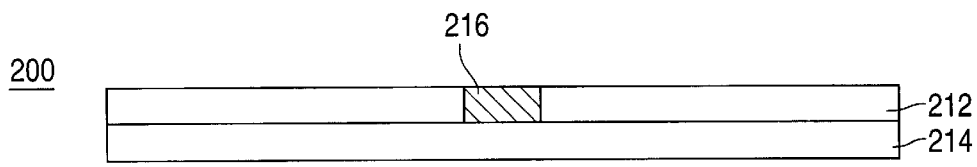
Figure 2A:
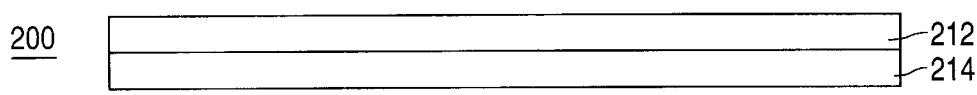
Figure 2B:
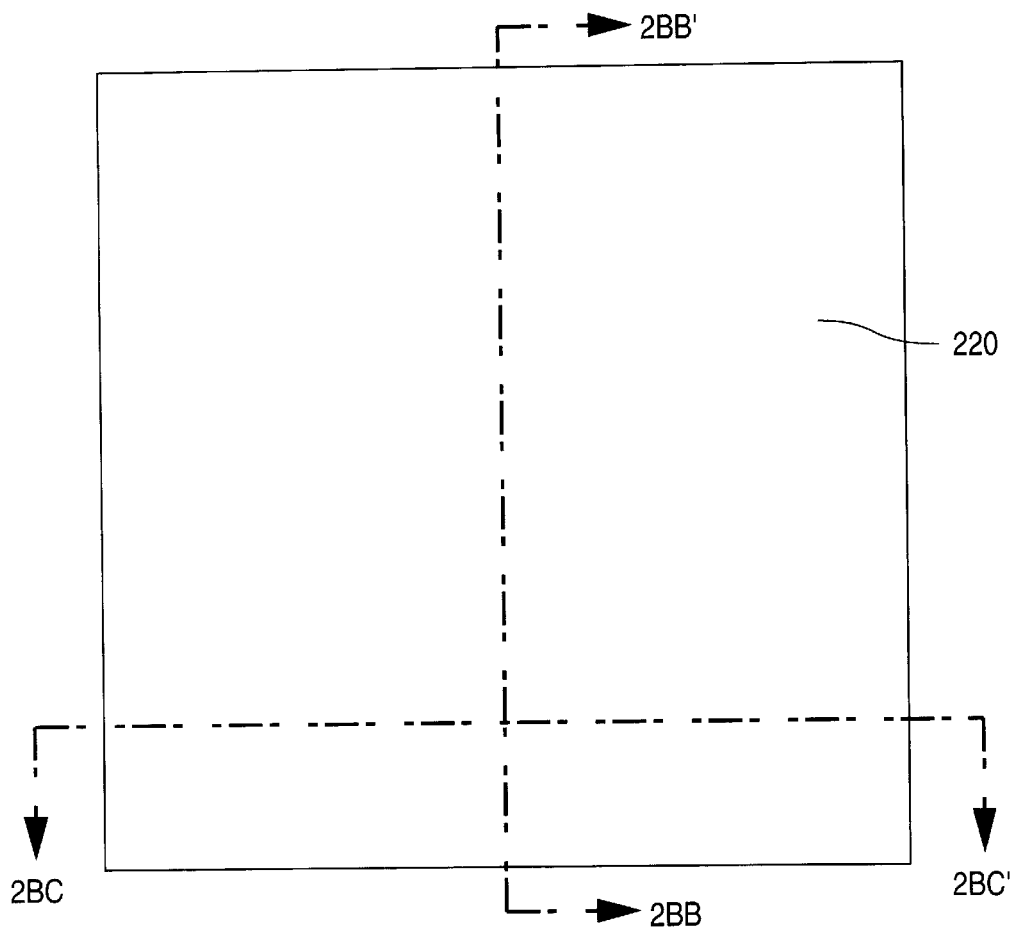
Figure 2B:
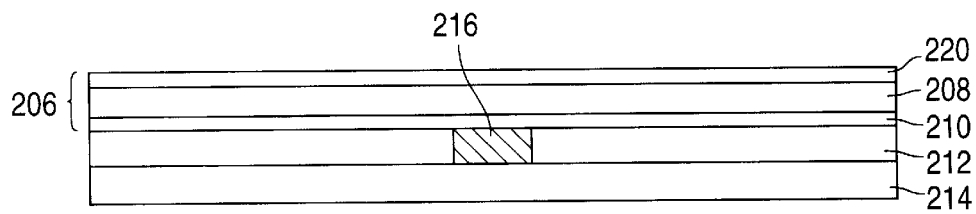
Figure 2B:
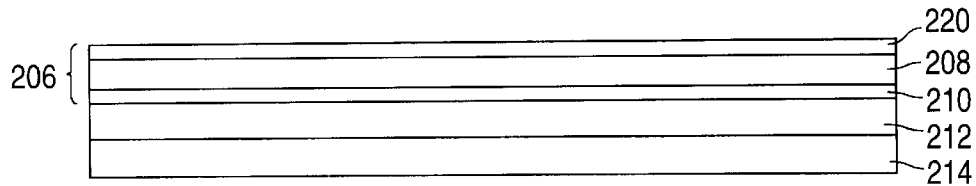
Figure 2C:
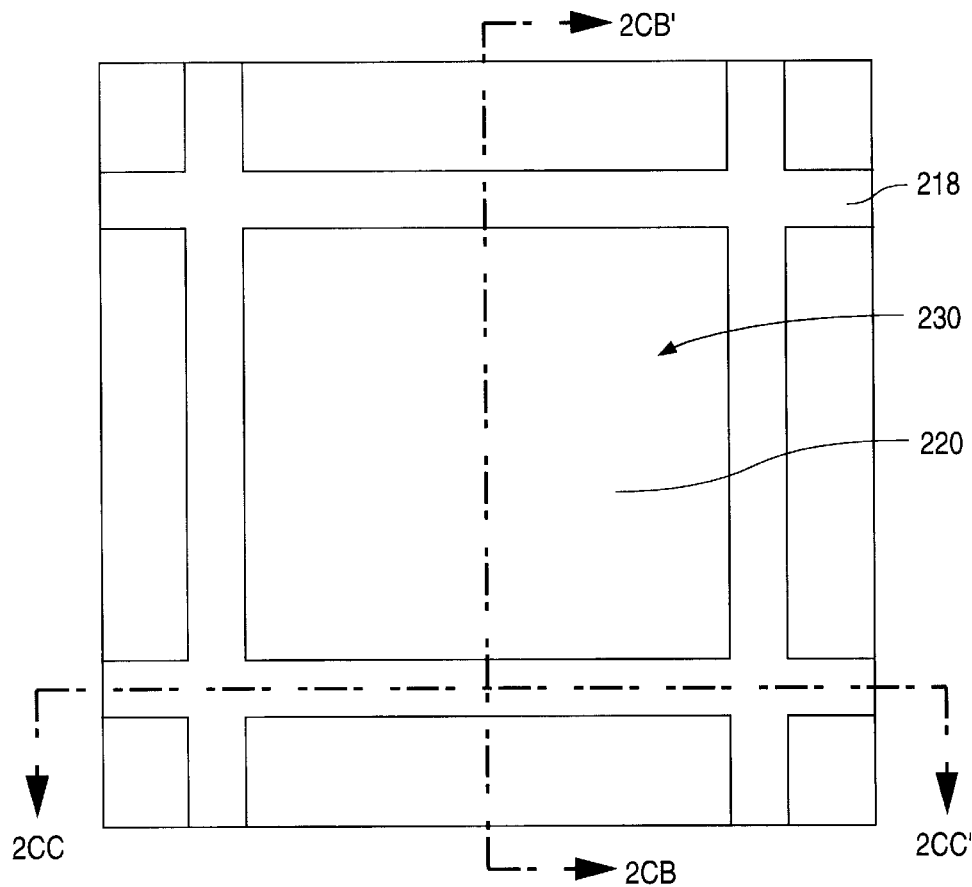
Figure 2C:
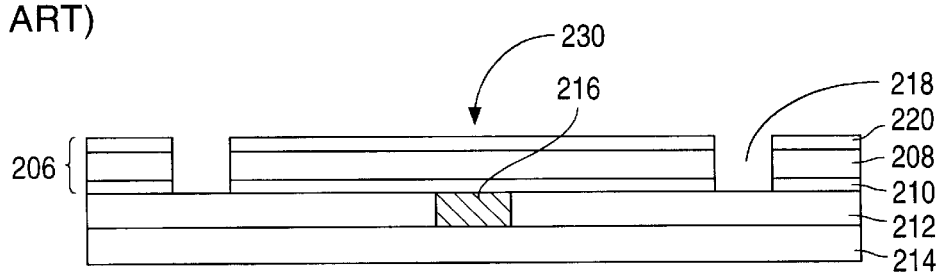
Figure 2C:
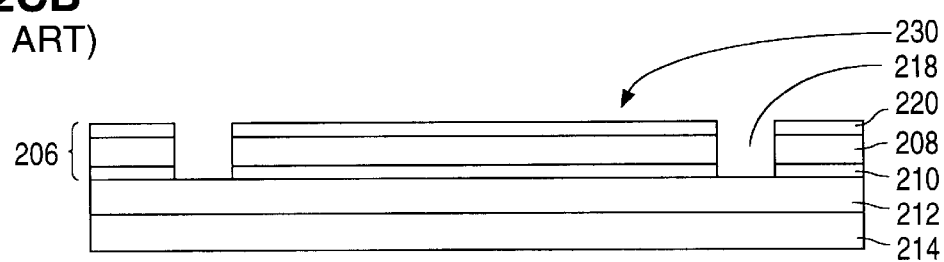
Figure 2D:
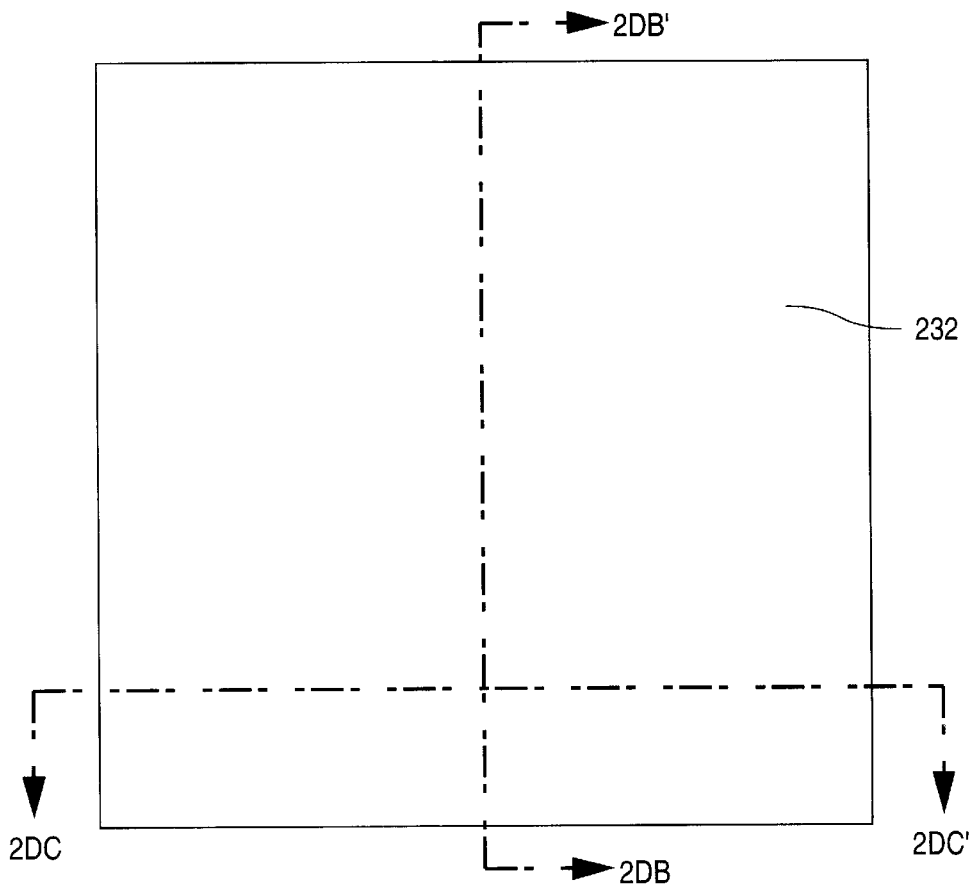
Figure 2D:
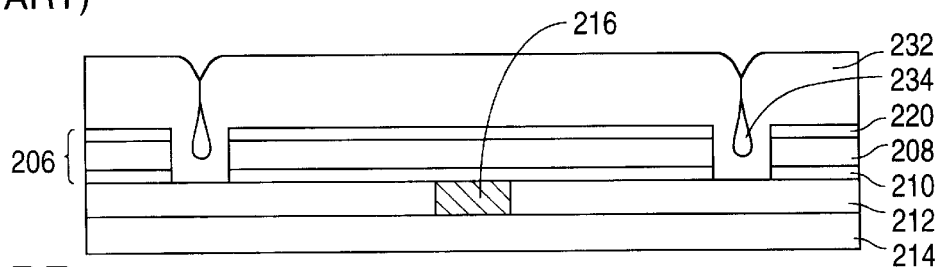
Figure 2D:
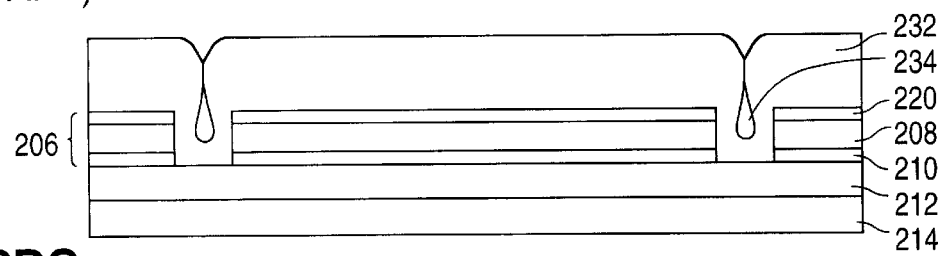
Figure 2E:
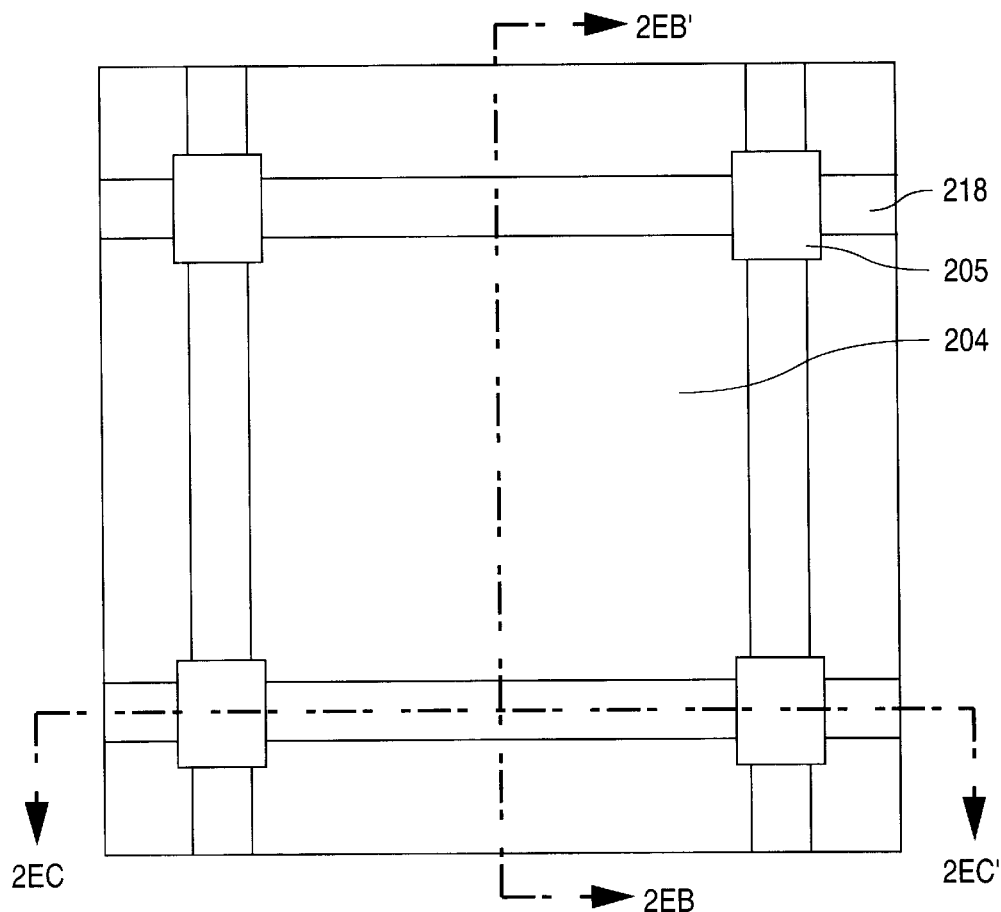
Figure 2E:
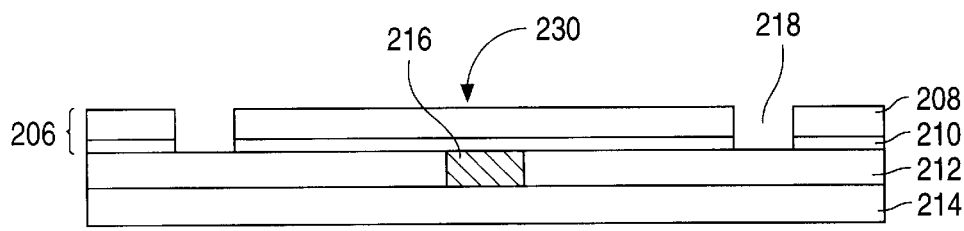
Figure 2E:
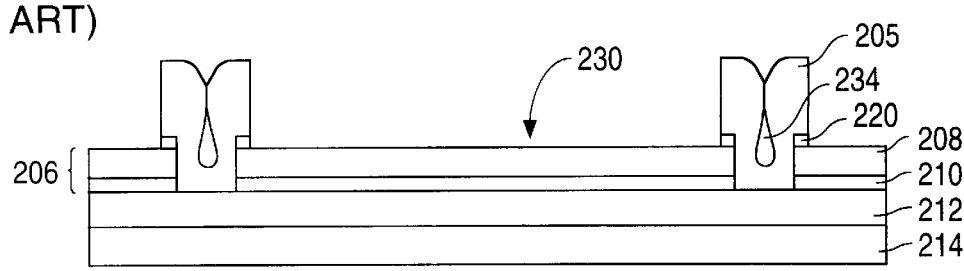

FIGS. 3AA–3AC, identical to prior FIGS. 2AA–2AC, illustrates the starting point for the process of forming the thin LC transducer pixel cell. Starting structure 300 is created by forming an upper intermetal dielectric layer 312 over a lower interconnect metallization layer 314. A central portion of upper intermetal dielectric layer 312 is then etched to form a via 316. A liner (not shown) typically composed of a Ti/TiN layer combination, is then formed on the walls of via 316, and via 316 is filled with metal (typically CVD Tungsten). Excess metal is then removed from the surface of the upper intermetal dielectric 312, typically by a combination of etching and chemical-mechanical polishing (CMP).

Figure 3B:
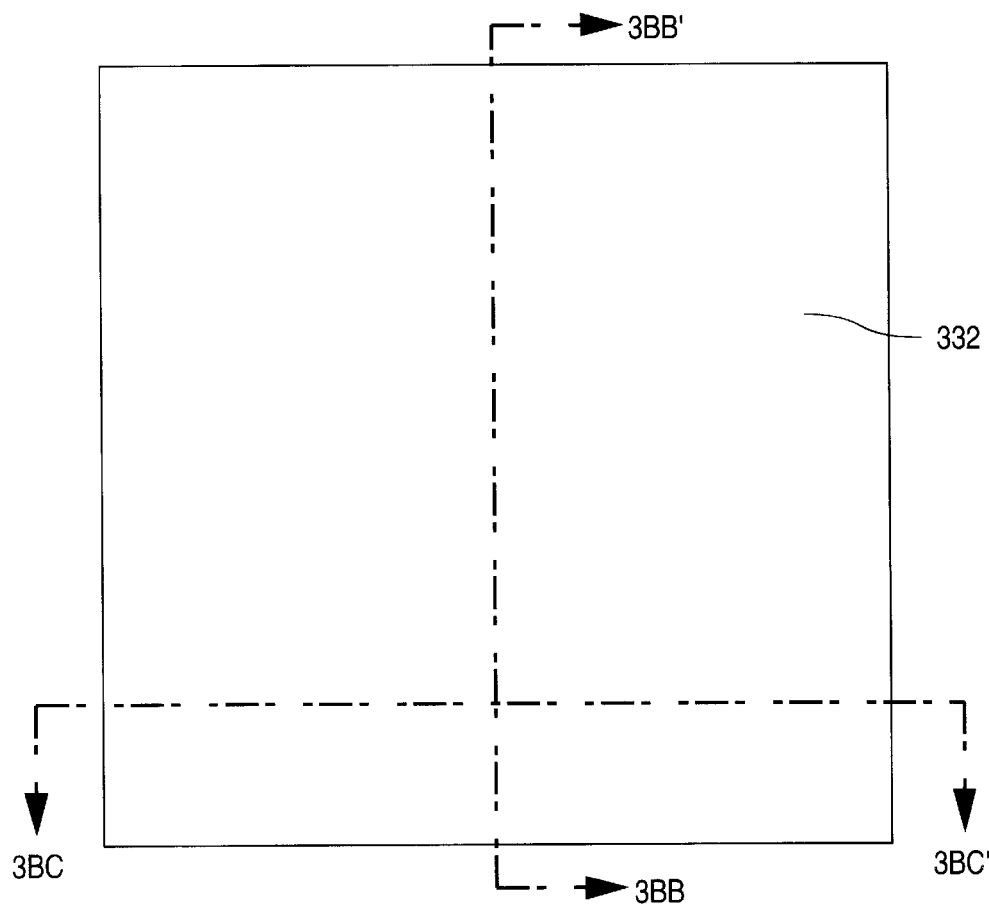
Figure 3B:
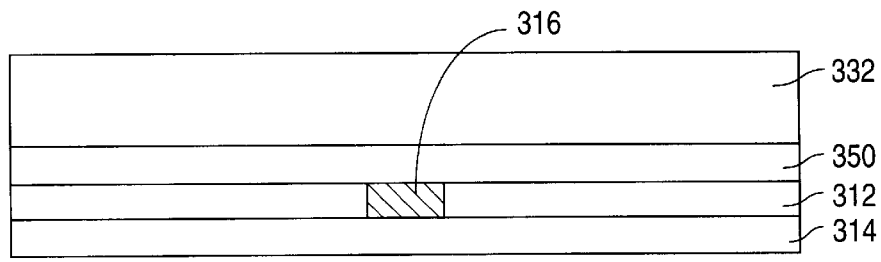
Figure 3B:
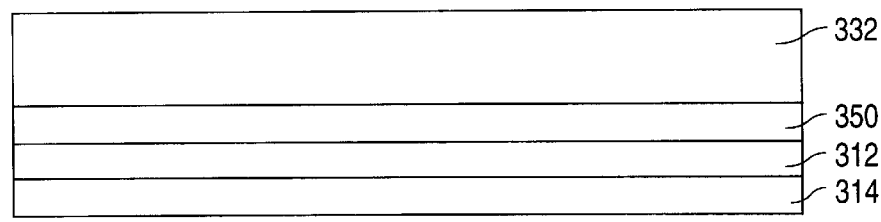

FIGS. 3BA–3BC show the formation of an etch stop nitride layer 350 on-top of upper intermetal dielectric layer 312 and metal-filled via 316. Etch-stop layer 350 is typically formed by silicon nitride having a thickness of 2000 Å. Nitride layer 350 will later eventually serve as an etch-stop for creating the dielectric spacer walls. FIGS. 3BA–3BB also show formation of spacer wall dielectric layer 332 on top of etch-stop nitride layer 350. Spacer wall dielectric layer 332 is typically formed from about 15,000 Å of silicon dioxide. The support pillars of the array will ultimately be formed from spacer wall dielectric layer 352.

Figure 3C:
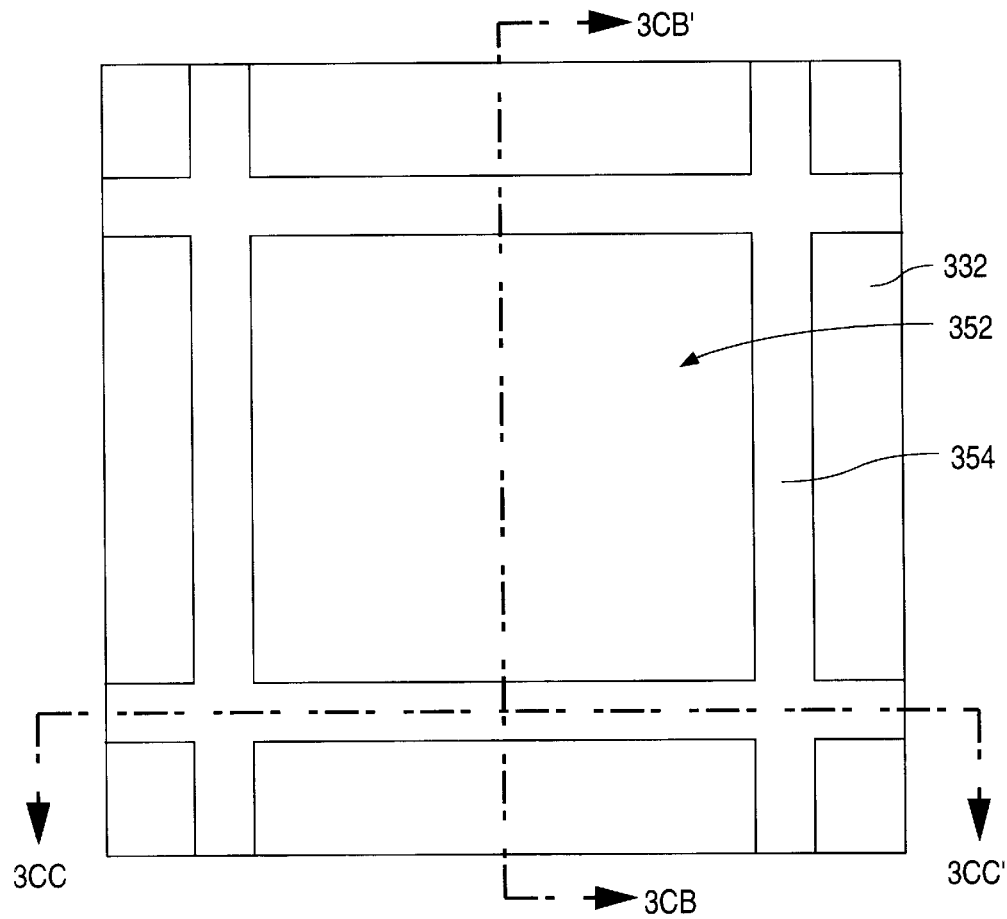
Figure 3C:
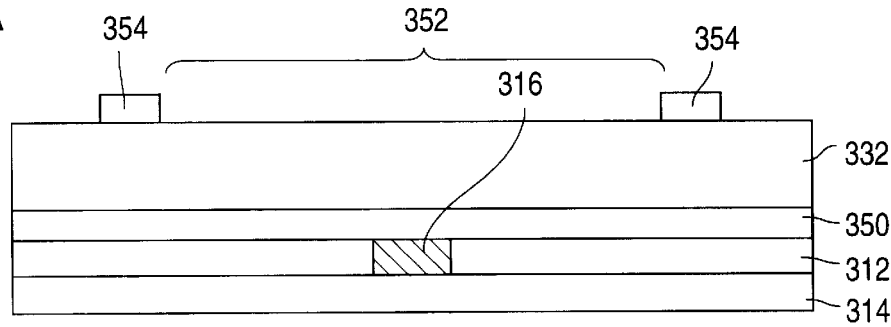
Figure 3C:
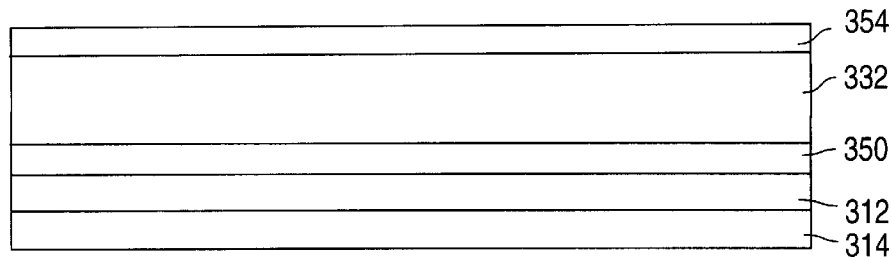

FIGS. 3CA–3CC show patterning of a spacer wall photoresist mask 354 over spacer wall dielectric layer 332. Portions of dielectric layer 332 unmasked by photoresist 354 correspond to precursor pixel regions 352.

Figure 3D:
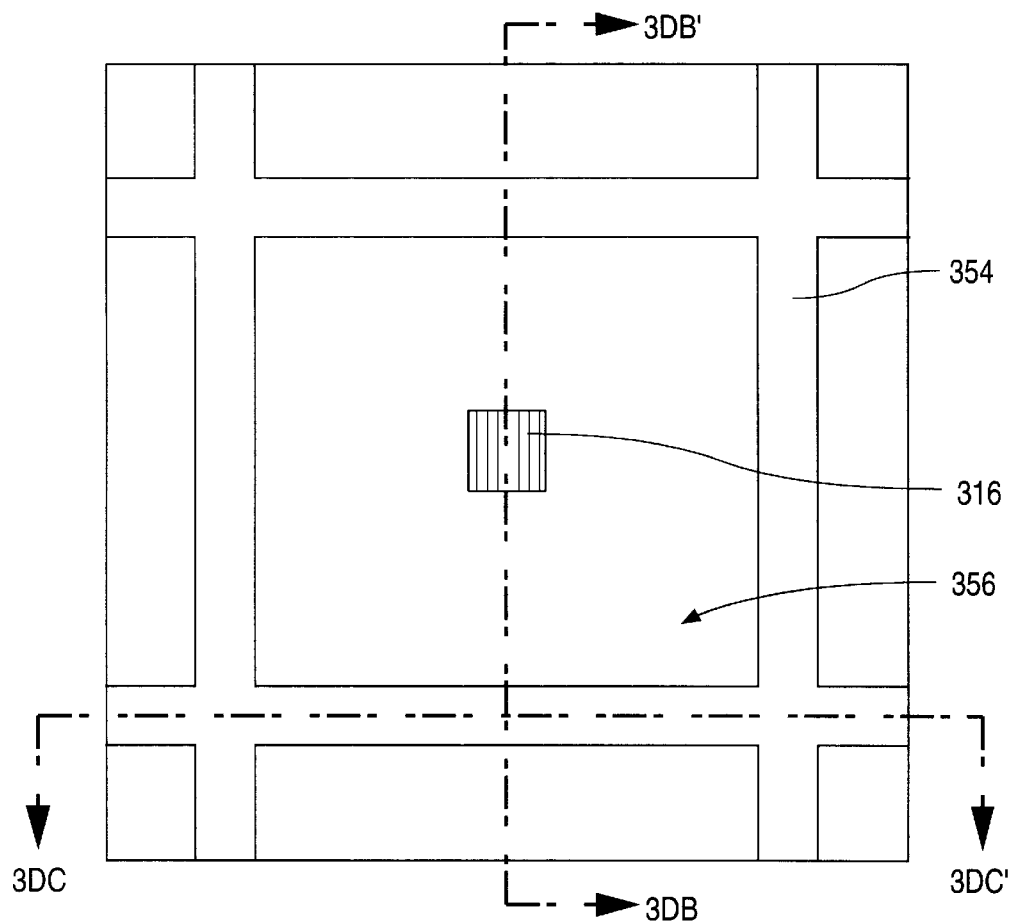
Figure 3D:
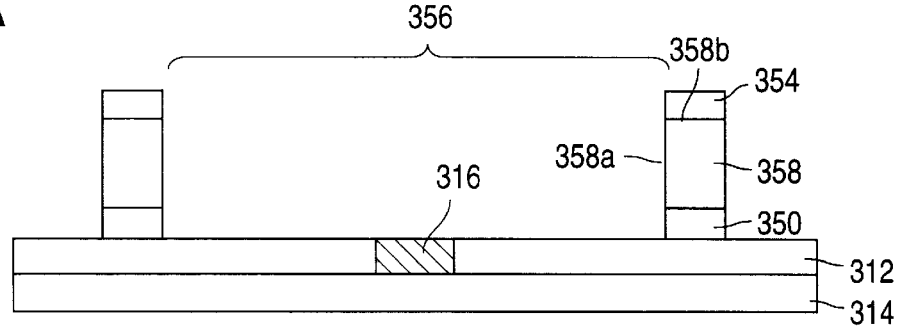
Figure 3D:
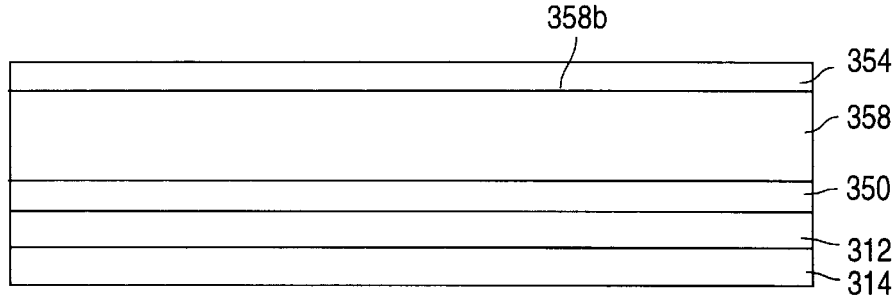

FIGS. 3DA–3DC show etching of the unmasked precursor regions to produce pixel regions 356 separated by spacer walls 358 formed from spacer wall dielectric layer 332. Spacer walls 358 includes sides 358a and top surface 358b. Nitride layer 350 serves as an initial etch-stop, with a subsequent etching step specific to silicon nitride removing only etch-stop layer 350. Upper intermetal dielectric layer 312 is not affected by etching during this removal of silicon nitride etch stop layer 350.

Figure 3E:
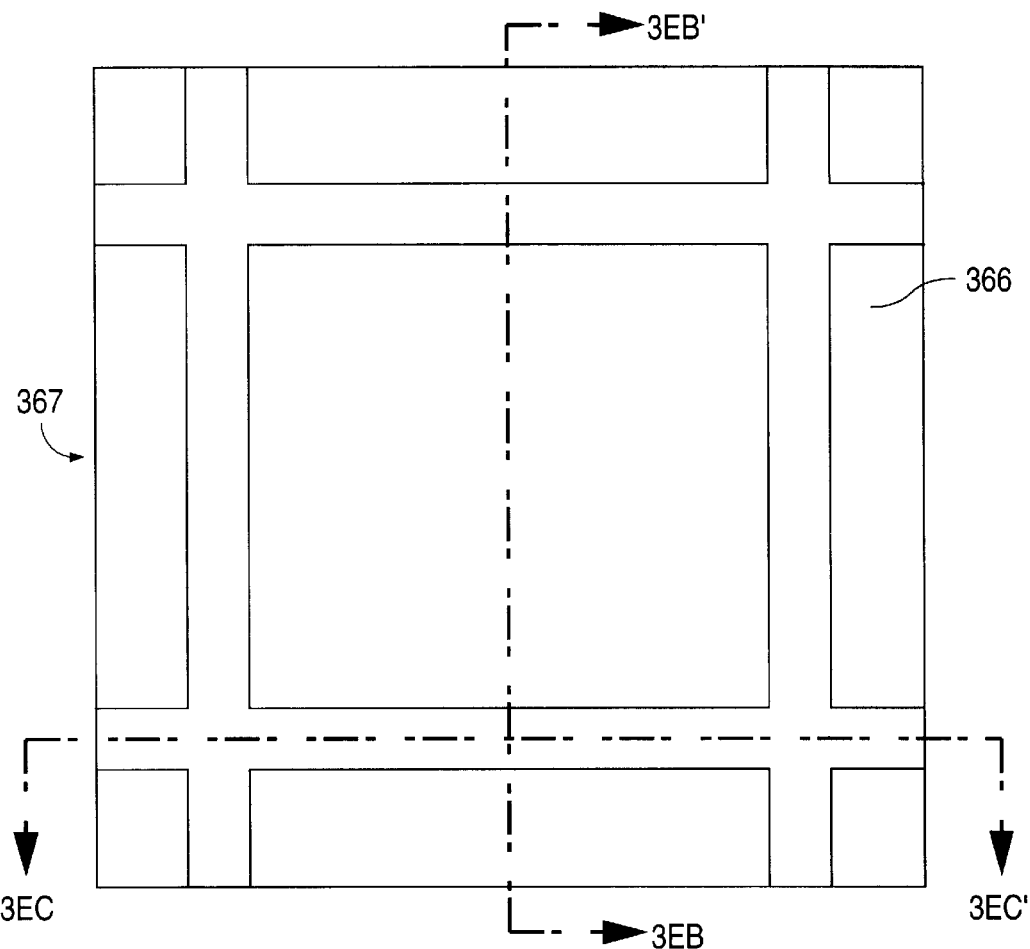
Figure 3E:
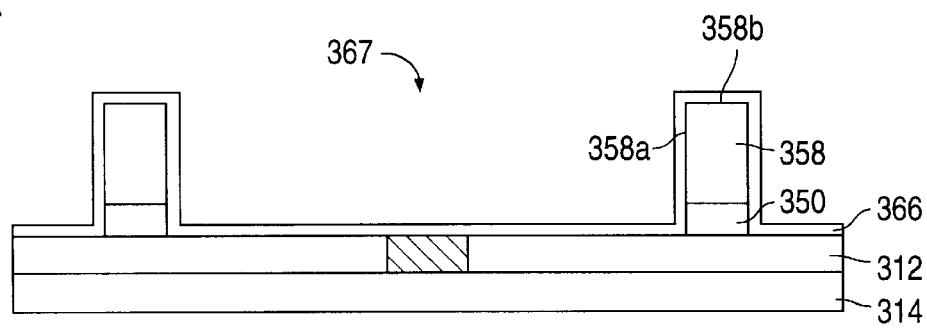
Figure 3E:
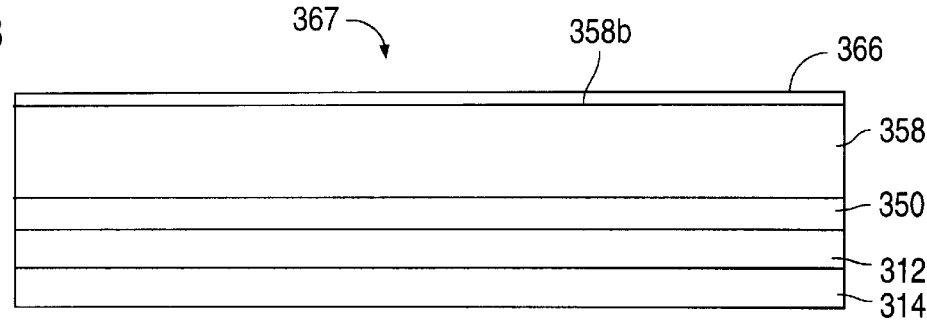

FIGS. 3EA–3EC show removal of spacer wall photoresist mask 354, exposing top surface 358b of spacer walls 358. Electrode liner layer 366 is then formed over the entire surface, with liner layer 366 conforming to sides 358a and top surface 358b of spacer walls 358. Electrode liner layer 366 is typically formed from about 300 Å of Titanium.

Figure 3F:
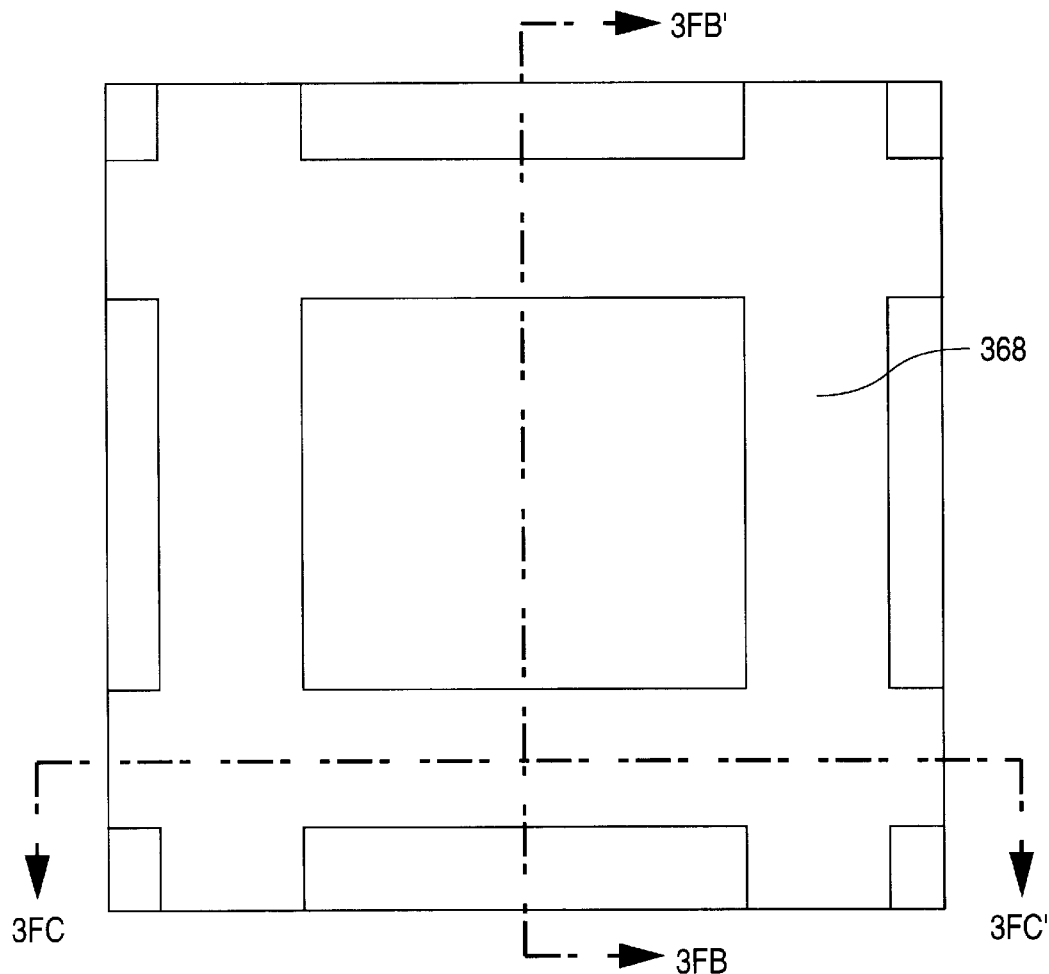
Figure 3F:
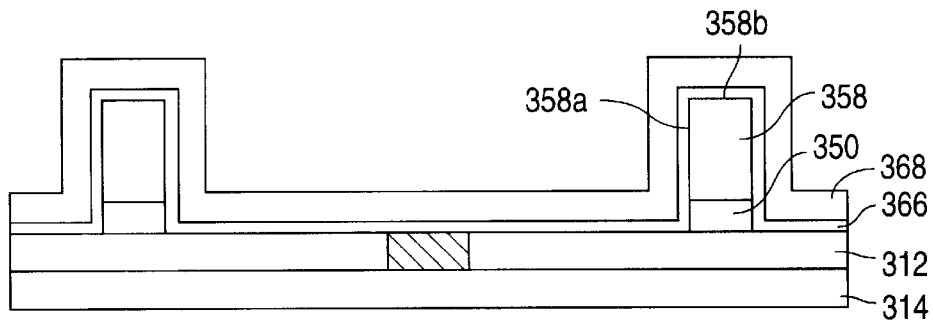
Figure 3F:
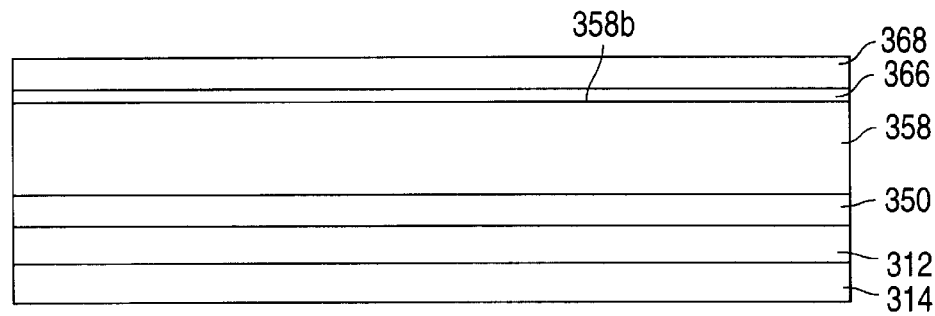

FIGS. 3FA–3FC show deposition of metal electrode layer 368 over electrode liner layer 366, with metal electrode layer 368 also conforming to sides 358a and top surface 358b of spacer walls 358. Metal electrode layer 368 is typically formed from an Al/Cu mixture having a thickness of about 2000 Å.

Figure 3G:
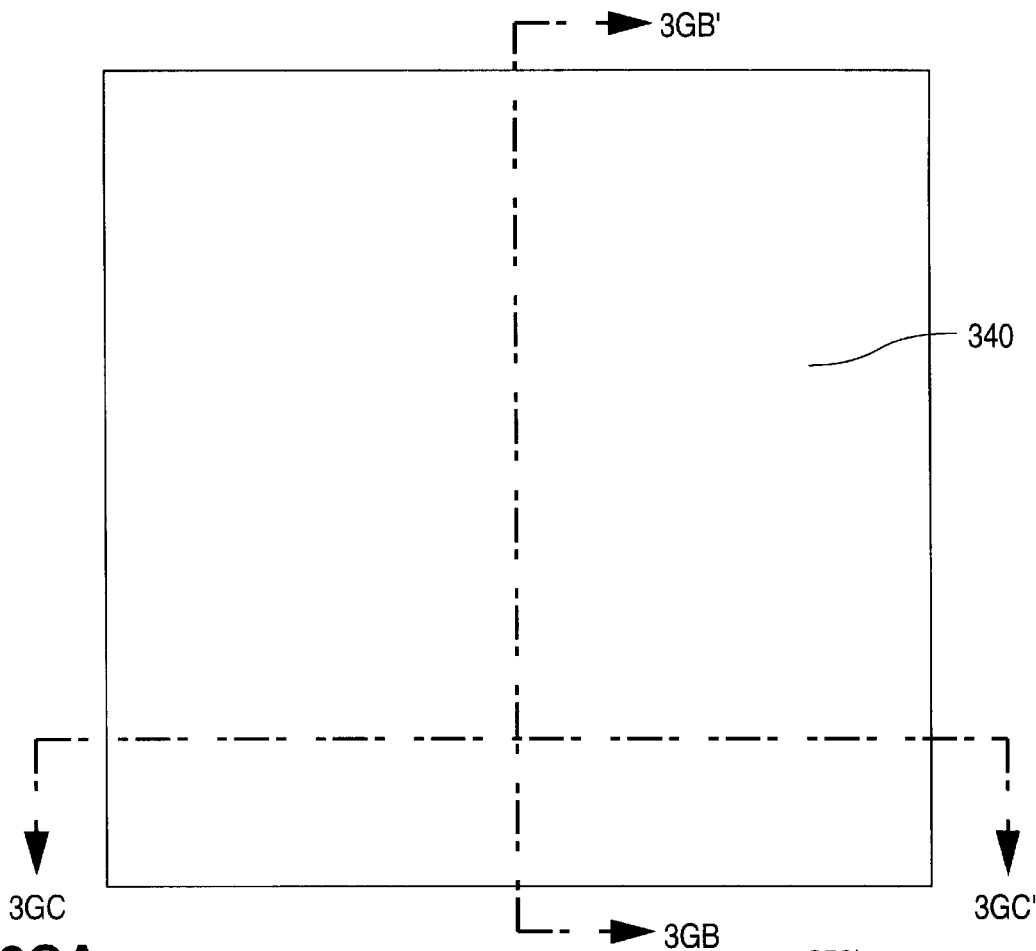
Figure 3G:
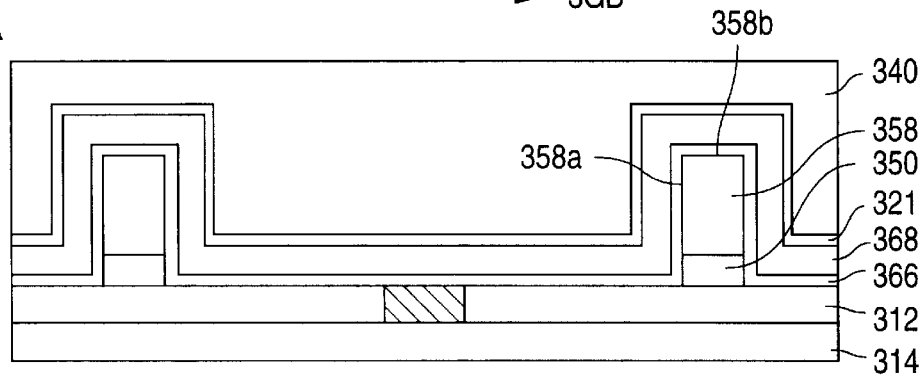
Figure 3G:
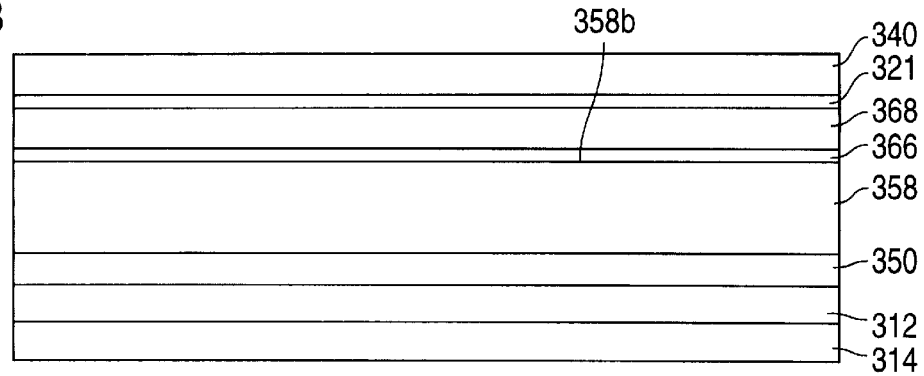

FIGS. 3GA–3GC show formation of thin passivation layer 321 on top of metal electrode layer 368, again with passivation layer 321 conforming to sides 358a and top surface 358b of spacer walls 358. Passivation layer 321 serves to protect underlying metal electrode layer 368 from roughening during subsequent etching steps.

Moreover, as described in pending U.S. patent application Ser. No. 08/872,013, passivation layer 321 may also serve to enhance the reflectance of the pixel electrode. By forming passivation layer 321 from a number of thin films that promote constructive interference of light rays reflected off of the underlying metal electrode layer 368, passivation layer 321 can endow the pixel cell with greater reflectance than it would possess with a metal electrode layer 308 alone. However, in order to effectively accomplish such constructive interference, the surface of passivation layer 321 must remain smooth and unaffected by subsequent etching processes.

After formation of passivation film 321 over metal electrode layer 368, a thick (approx. 15,000 Å) layer of photoresist 340 is spun over the entire surface and then hardened. The spun photoresist is then hardened by heating it to between approximately 130 and 150° C.

Figure 3H:
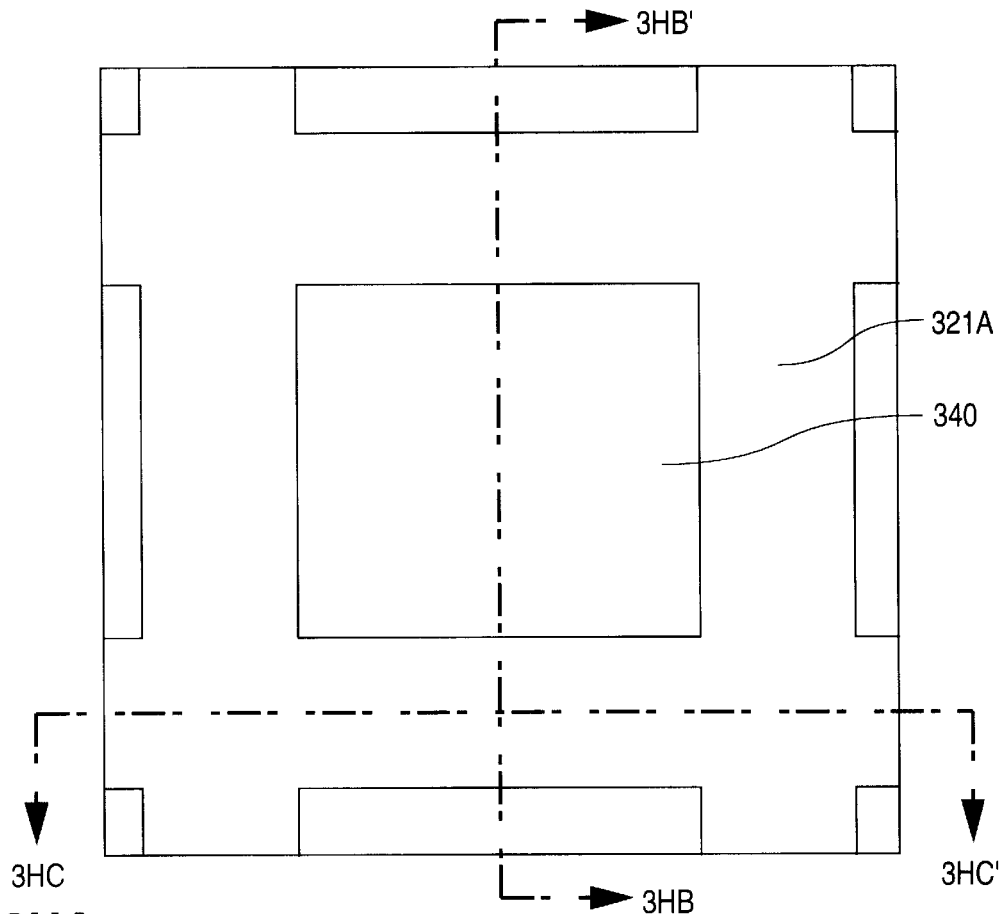
Figure 3H:
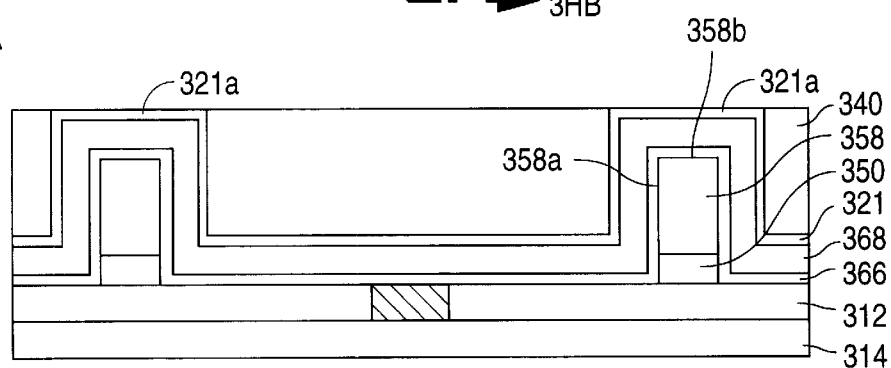
Figure 3H:
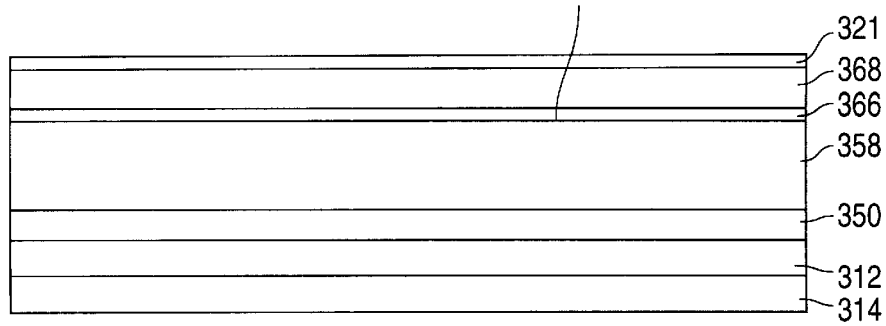

FIGS. 3HA–3HC illustrate the self-aligned nature of the current process. During this step, hardened photoresist layer 340 is etched back far enough to expose portion 321a of passivation layer 321 located on top surface 358b of spacer wall 358.

Figure 3I:
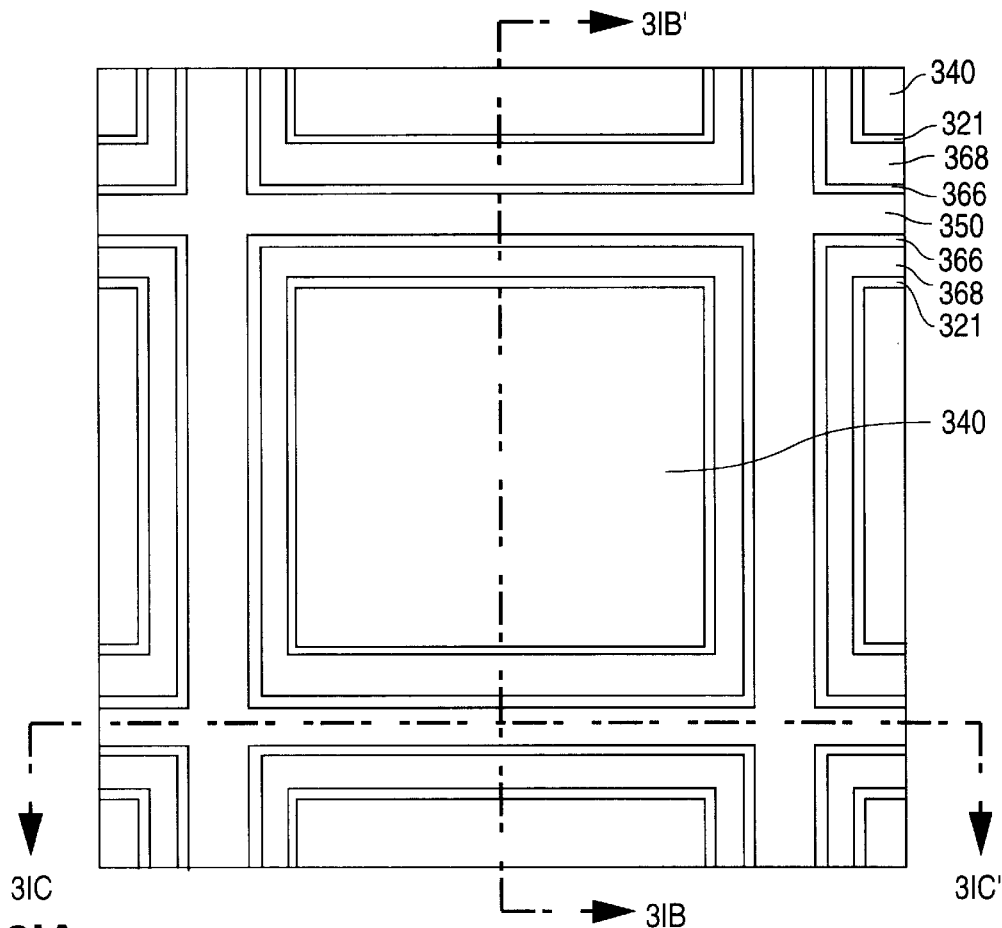
Figure 3I:
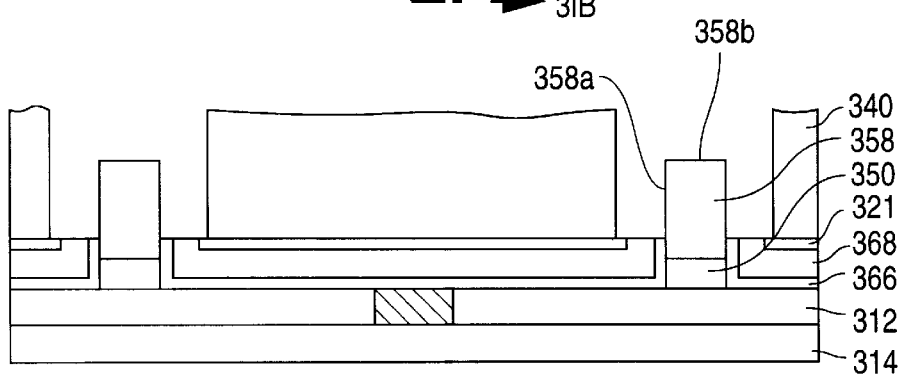
Figure 3I:
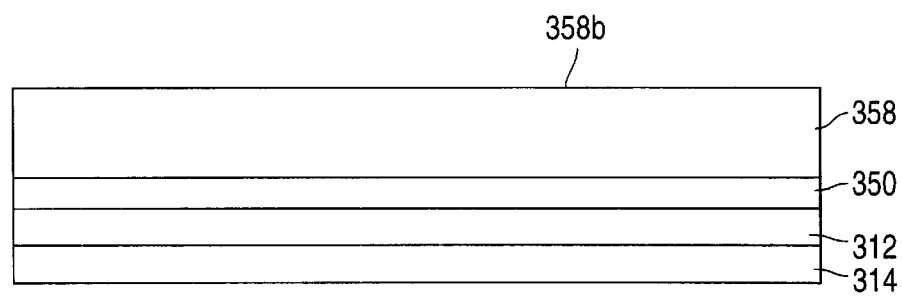

FIGS. 3IA–3IC illustrate the result of exposing regions not protected by hardened photoresist layer 340 to etching conditions. Specifically, etching portion 321a of passivation layer 321 exposes underlying electrode liner 366 and metal electrode 368 material along sides 358a of spacer walls 358. Continued etching along the margins of the spacer walls eliminates portions of layers 321, 368, and 366 encasing the spacer walls 358.

By carefully controlling etching conditions during this step, electrode liner 366, metal electrode 368, and passivation 321 material encasing the sides 358a of spacer walls 358 can be removed to a height approximating that of the remaining nitride etch stop layer 350. As described below, subsequent etching of the spacer walls to stop on the etch-stop layer thus produces support pillars and inter-pixel isolation strips substantially planar with the pixel electrodes.

FIGS. 3JA–3JC show the first step of forming the support pillars and inter-pixel isolation strips. Additional photoresist material is spun over hardened photoresist layer 340, penetrating into the gaps along margins of the spacer walls and covering the tops 358b of the spacer walls 358.

Support pillar photoresist mask 360 is then selectively patterned to cover a first portion of the spacer walls and exclude a second portion of the spacer walls. As shown in FIGS. 3JA–3JC, points of intersection of raised spacer walls 358 are covered by support pillar photoresist mask 360. Intervening lengths of the spacer walls remain unmasked.

Figure 3K:
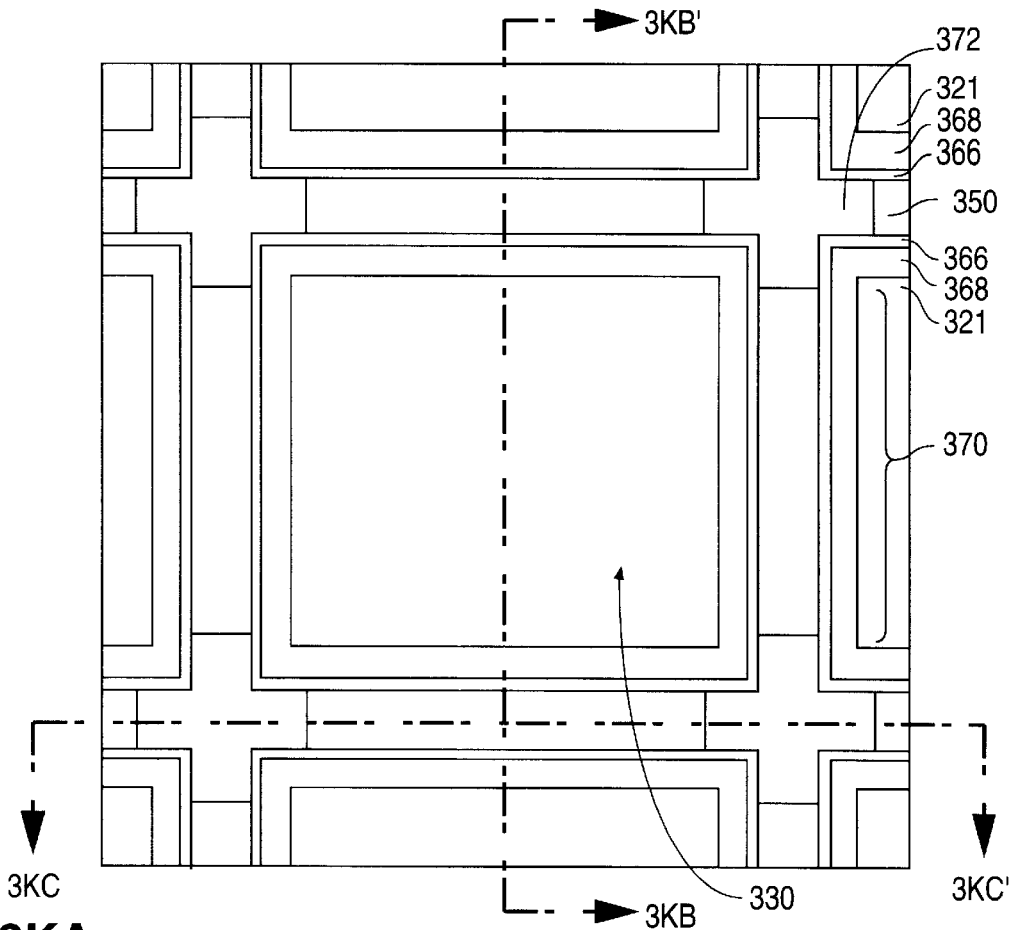
Figure 3K:
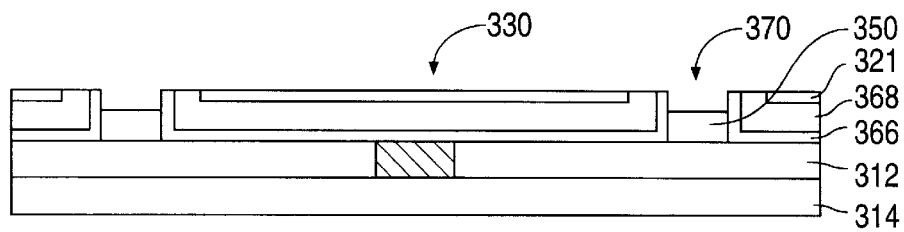
Figure 3K:
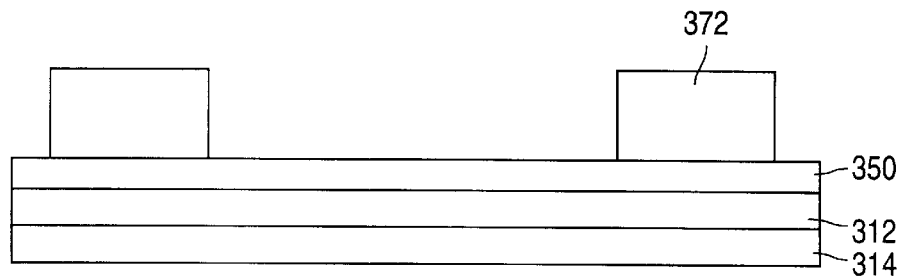

FIGS. 3KA–3KC show the second step of forming the support pillars and planar inter-pixel isolation strips from the spacer walls, wherein unmasked portions of spacer walls 358 are etched to stop on nitride layer 350. This etching leaves only support pillars 372 standing at points of intersection of the former spacer walls. Stripping hardened photoresist layers 340 and 360 reveals discrete pixel electrodes 330 separated by inter-pixel isolation strips 370.

Isolation strips 370 are composed of silicon nitride 350. Where prior etching along the sides of the spacer walls (prior FIGS. 3IA–3IC) has been controlled to ensure that pixel liner, metal electrode, and passivation material bordering isolation strips 370 is approximately the same height as the pixel electrodes 330, a substantially planar pixel cell array surface is created.

FIG. 3KB shows some difference in height between pixel electrode 330 and inter-pixel isolation strip 370. However, this height differential is exaggerated, and would not substantially affect reflectance. Moreover, the deposition of the etch-stop nitride layer 350 forming inter-pixel isolation strip 370 may be controlled to ensure ultimate planarity with the later-formed pixel electrodes.

Fabrication of thin LC transducer pixel cell is completed by creating and scoring the alignment surface as discussed above in conjunction with the conventional process, followed by insertion of liquid crystal material and sealing the cell with a top glass plate.

The process for fabricating the thin LC transducer pixel cell in accordance with the present invention offers a number of important advantages over existing processes.

First, hillock formation is diminished relative to the conventional process. This is because photoresist, rather than a thick oxide layer, is formed over the pixel electrode layer. As described above in connection with FIGS. 3GA–3GC, this photoresist layer is hardened heating to between about 130–150° C. This is significantly cooler than the 300–400° C. heating associated with oxide deposition. The reduced temperature difference between metal electrode layer and overlying photoresist reduces the incidence of hillocks.

A second advantage offered by the process in accordance with the present invention is that the surface of the pixel electrode layer is not exposed to oxide etching conditions that could roughen or oxidize its surface and reduce reflectance. In the conventional process, the support pillars are created by etching an oxide layer formed over the pixel electrode layer. In the process flow in accordance with the present invention, the pixel electrode layer is deposited after formation of the spacer walls and masked from subsequent oxide etching by hardened photoresist. This photoresist is ultimately removed under conditions less detrimental to reflectance than oxide etching.

A third advantage offered by the process in accordance with the present invention is elimination of unwanted keyhole voids within the support pillars. As discussed above, keyhole voids form during deposition of dielectric into narrow trenches. In the present process, the spacer wall silicon dioxide layer is formed directly over an etch-stop layer devoid of trenches. Thus, there is no formation of keyhole voids which could adversely affect the structural integrity of the support pillars.

A fourth advantage offered by the process in accordance with the present invention is that the resulting surface of the pixel cell array exhibits a minimum of surface topology. Specifically, the height of the isolation strips is intentionally designed to match the height of the surrounding electrodes. This is accomplished by carefully controlling thickness of the etch stop layer deposited, and the extent of vertical etching along the sides of the spacer walls. As a result, there is little or no interruption in the planarity of the surface of the electrodes to interact with incident light or to trigger misalignment of the overlying LC. The planar array surface thus offers excellent reflective properties.

Although the invention has been described in connection with one specific preferred embodiment, it should be understood that the invention as claimed should not be unduly limited to this specific embodiment. Various modifications and alterations in the described process flow will be apparent to those skilled in the art, without departing from the scope of the present invention.

For example, the process in accordance with the first embodiment of the present invention utilizes silicon dioxide as the thick dielectric layer forming the spacer walls and ultimately the support pillars. However, an alternative dielectric material such as silicon nitride could also be utilized, although obviously in conjunction with an etch stop layer other than silicon nitride. In addition, the specific thicknesses of the various layers cited above could be varied, and the process flow would still remain within the scope of the present invention.

Moreover, the photoresist spun to cover the spacer walls in FIG. 3GA–3GC may hardened and prepared for etching by other than heating. For example, spun resist may be hardened by exposing it to developing solution. Alternatively, spun photoresist may be hardened by exposing it to radiation. In either case, hillock formation will continue to be inhibited because the underlying pixel electrode layer will be exposed to a smaller temperature difference than would occur during oxide deposition.

Furthermore, etching of pixel liner, pixel electrode, and passivation oxide at the margins of the spacer walls can be performed under a variety of conditions to yield isolation strips having a variety of vertical profiles. For example, etching at the spacer wall margins can be performed to leave little or no material above the upper intermetal dielectric layer. Conversely, the passivation, pixel liner, and metal pixel electrode material remaining after etching along the spacer wall margins may rise above the etch-stop layer, so long as the individual pixel electrodes remain electrically isolated from one another.

In addition, FIGS. 3JA–3KC depict patterning of a spacer wall photoresist mask that covers every point of intersection of the raised dielectric spacer walls. However, the process flow in accordance with the present invention is not limited to a spacer wall photoresist mask having this shape. Specifically, a spacer wall photoresist mask could be formed excluding some points of intersection of the spacer walls. Alternatively, a spacer wall photoresist mask could be formed excluding all points of intersection of the spacer walls but including selected lengths of the spacer walls. The support pillar photoresist mask must simply ensure creation of support pillars of sufficient size and number to adequately support the top plate.

Therefore, it is intended that the following claims define the scope of the present invention, and that the methods and structures within the scope of these claims and their equivalents be covered hereby.

What is claimed is:

1. A process for forming an array of liquid crystal pixel cells comprising the steps of:
    forming a plurality of raised, intersecting dielectric spacer walls over an intermetal dielectric layer, the spacer walls having sides and top surface;
    forming an electrode liner layer over the intermetal dielectric layer and the sides and the top surface of the spacer walls;
    forming a metal electrode layer over the electrode liner layer;
    forming a passivation layer over the metal electrode layer;
    forming a photoresist layer over the passivation layer;
    etching the photoresist layer to expose a portion of the passivation layer located over the top surface of the spacer walls;
    etching the exposed portion of the passivation layer and underlying portions of the electrode liner layer and the metal electrode layer located along the sides of the spacer walls;
    patterning a support pillar photoresist mask to cover a first portion of the spacer walls and exclude a second portion of the spacer walls; and
    etching the second portion of the spacer walls to produce support pillars.

2. The process according to claim 1 wherein the step of patterning the support pillar photoresist mask includes patterning the support pillar photoresist mask such that the first portion of the spacer walls is a point of intersection of the spacer walls.

3. The process according to claim 1 wherein:
    the step of forming the spacer walls comprises forming a plurality of raised, silicon oxide spacer walls having a height of approximately 15,000 Å;
    the step of forming the electrode liner layer comprises forming a layer of Ti having a thickness of approximately 300 Å;
    the step of forming the metal electrode layer comprises forming a layer of Al/Cu having a thickness of approximately 2000 Å; and
    the step of forming the photoresist layer comprises forming a photoresist layer having a thickness of approximately 15,000 Å.

4. The process according to claim 1 wherein the step of forming a plurality of spacer walls comprises the steps of:
    forming an etch stop layer having a thickness over the intermetal dielectric layer;
    forming a spacer wall dielectric layer over the etch stop layer;
    patterning a spacer wall photoresist mask over the spacer wall dielectric layer, such that the spacer wall photoresist mask excludes precursor pixel cell regions;
    etching the dielectric layer in precursor pixel cell regions to stop at the etch stop layer, such that the plurality of spacer walls are formed from the spacer wall dielectric layer; and
    etching the etch stop layer in precursor pixel cell regions to stop on the intermetal dielectric layer.

5. The process according to claim 4 wherein the step of patterning the support pillar photoresist mask includes patterning the support pillar photoresist mask such that the first portion of the spacer walls is a point of intersection of the spacer walls.

6. The process according to claim 4 wherein:
    the step of forming an etch stop layer comprises forming a silicon nitride layer having a thickness of approximately 2000 Å;
    the step of forming the spacer wall dielectric layer comprises forming a silicon oxide layer having a height of approximately 15,000 Å;
    the step of forming the electrode liner layer comprises forming a layer of Ti having a thickness of approximately 300 Å;
    the step of forming the metal electrode layer comprises forming a layer of Al/Cu having a thickness of approximately 2000 Å; and
    the step of forming the photoresist layer comprises forming a photoresist layer having a thickness of approximately 15,000 Å.

7. The process according to claim 4 wherein:
    the step of etching the second portion of the spacer walls to produce support pillars comprises etching the second portion of the spacer walls to stop on the etch stop layer; and
    the step of etching the exposed portion of the passivation layer comprises etching the exposed portion of the passivation layer and the underlying portion of the electrode liner layer and the metal electrode layer along the sides of the spacer walls to a height approximately matching the thickness of the etch stop layer.

8. The process according to claim 7 wherein the step of patterning the support pillar photoresist mask includes patterning the support pillar photoresist mask such that the first portion of the spacer walls is a point of intersection of the spacer walls.

9. The process according to claim 7 wherein:
the step of forming an etch stop layer comprises forming a silicon nitride layer having a thickness of approximately 2000 Å;
the step of forming the spacer wall dielectric layer comprises forming a silicon oxide layer having a height of approximately 15,000 Å;
the step of forming the electrode liner layer comprises forming a layer of Ti having a thickness of approximately 300 Å;
the step of forming the metal electrode layer comprises forming a layer of Al/Cu having a thickness of approximately 2000 Å; and
the step of forming the photoresist layer comprises forming a photoresist layer having a thickness of approximately 15,000 Å.

10. The process according to claim 9 wherein the step of etching the exposed portion of the passivation layer comprises etching the exposed portion of the passivation layer and the underlying portion of the electrode liner layer and the metal electrode layer along the sides of the spacer walls to a height above the intermetal dielectric layer of approximately 2000 Å.

11. In a process for forming an array of liquid crystal pixel cells including the step of forming a metal electrode layer over an electrode liner layer, the improvement comprising the steps of:
forming a plurality of raised, intersecting dielectric spacer walls over an intermetal dielectric layer, the spacer walls having sides and a top surface;
forming the electrode liner layer over the intermetal dielectric layer and the sides and top surface of the spacer walls;
forming the metal electrode layer over the electrode liner layer;
forming a passivation layer over the metal electrode layer;
forming a photoresist layer over the passivation layer;
etching the photoresist layer to expose a portion of the passivation layer located over the top surface of the spacer walls;
etching the exposed portion of the passivation layer and underlying portions of the electrode liner layer and the metal electrode layer located along the sides of the spacer walls;
patterning a support pillar photoresist mask that covers a first portion of the spacer walls and excludes a second portion of the spacer walls; and
etching the second portion of the spacer walls to produce support pillars.

12. The improved process according to claim 11 wherein the step of patterning the support pillar photoresist mask includes patterning the support pillar photoresist mask so that the first portion is a point of intersection of the spacer walls.

13. The improved process according to claim 11 wherein the step of forming a plurality of spacer walls comprises the steps of:
forming an etch stop layer having a thickness over the intermetal dielectric layer;
forming a spacer wall dielectric layer over the etch stop layer;
patterning a spacer wall photoresist mask over the spacer wall dielectric layer, such that the spacer wall photoresist mask excludes precursor pixel cell regions;
etching the dielectric layer in precursor pixel cell regions to stop at the etch stop layer, such that the plurality of spacer walls are formed from the spacer wall dielectric layer; and
etching the etch stop layer in precursor pixel cell regions to stop on the intermetal dielectric layer.

14. The improved process according to claim 13 wherein the step of patterning the support pillar photoresist mask includes patterning the support pillar photoresist mask so that the first portion is a point of intersection of the spacer walls.

15. The improved process according to claim 13 wherein:
the step of etching the second portion of the spacer walls to produce support pillars comprises etching the second portion of the spacer walls to stop on the etch stop layer; and
the step of etching the exposed portion of the passivation layer comprises etching the exposed portion of the passivation layer and the underlying portion of the electrode liner layer and the metal electrode layer along the sides of the spacer walls to a height above the intermetal dielectric layer approximately matching the thickness of the etch stop layer.

16. The improved process according to claim 15 wherein:
the step of forming an etch stop layer comprises forming a silicon nitride layer having a thickness of approximately 2000 Å;
the step of forming the spacer wall dielectric layer comprises forming a silicon oxide layer having a height of approximately 15,000 Å;
the step of forming the electrode liner layer comprises forming a layer of Ti having a thickness of approximately 300 Å;
the step of forming the metal electrode layer comprises forming a layer of Al/Cu having a thickness of approximately 2000 Å;
the step of forming the photoresist layer comprises forming a photoresist layer having a thickness of approximately 15,000 Å; and
the step of etching the exposed portion of the passivation layer comprises etching the exposed portion of the passivation layer and the underlying portion of the electrode liner layer and the metal electrode layer located along the sides of the spacer walls to a height above the intermetal dielectric layer of approximately 2000 Å.

17. A pixel cell array for a silicon light valve comprising:
an intermetal dielectric layer;
a plurality of pixel electrodes having a top surface and located on top of the intermetal dielectric layer;
a plurality of intersecting pixel isolation strips located on top of the intermetal dielectric layer between the pixel electrodes, the pixel isolation strips having a top surface approximately planar with the top surface of with the top surface of the pixel electrodes; and
a plurality of support pillars located on top of the pixel isolation strips.

18. The pixel cell array according to claim 17 wherein the intersecting pixel isolation strips comprise silicon nitride.

19. The pixel cell array according to claim 17 wherein the support pillars are located at points of intersection of the pixel isolation strips.

20. The pixel cell array according to claim 17 wherein the pixel isolation strips comprise an etch-stop layer utilized during formation of the support pillars.

* * * * *

UNITED STATES PATENT AND TRADEMARK OFFICE
CERTIFICATE OF CORRECTION

PATENT NO.: 5,982,472
DATED: November 9, 1999
INVENTOR(S): PAUL McKAY MOORE

It is certified that an error appears in the above-identified patent and that said Letters Patent is hereby corrected as shown below:

In Col. 12, lines 54-55, delete "with the top surface of".

Signed and Sealed this

Second Day of May, 2000

Attest:

Q. TODD DICKINSON

*Attesting Officer*    *Director of Patents and Trademarks*